(12) United States Patent
Nishi

(10) Patent No.: US 11,473,272 B2
(45) Date of Patent: Oct. 18, 2022

(54) SHOVEL, DISPLAY DEVICE FOR SHOVEL, AND DISPLAY METHOD FOR SHOVEL

(71) Applicant: SUMITOMO CONSTRUCTION MACHINERY CO., LTD., Tokyo (JP)

(72) Inventor: Takashi Nishi, Chiba (JP)

(73) Assignee: SUMITOMO CONSTRUCTION MACHINERY CO., LTD., Tokyo (JP)

( * ) Notice: Subject to any disclaimer, the term of this patent is extended or adjusted under 35 U.S.C. 154(b) by 276 days.

(21) Appl. No.: 16/782,395

(22) Filed: Feb. 5, 2020

(65) Prior Publication Data
US 2020/0173148 A1 Jun. 4, 2020

Related U.S. Application Data

(63) Continuation of application No. PCT/JP2018/029630, filed on Aug. 7, 2018.

(30) Foreign Application Priority Data

Aug. 9, 2017 (JP) .............................. JP2017-154060

(51) Int. Cl.
*E02F 9/26* (2006.01)
*E02F 3/32* (2006.01)

(52) U.S. Cl.
CPC ............... *E02F 9/264* (2013.01); *E02F 3/32* (2013.01)

(58) Field of Classification Search
CPC .... E02F 3/32; E02F 9/26; E02F 9/264; H04N 7/183
See application file for complete search history.

(56) References Cited

U.S. PATENT DOCUMENTS

| | | | | |
|---|---|---|---|---|
| 5,713,144 A | * | 2/1998 | Haraoka | E02F 3/437 37/348 |
| 8,914,199 B2 | | 12/2014 | Nomura et al. | |
| 9,043,098 B2 | * | 5/2015 | Nomura | E02F 9/261 701/50 |
| 9,458,598 B2 | * | 10/2016 | Takaura | E02F 3/437 |
| 9,824,490 B1 | * | 11/2017 | Cote | E02F 9/261 |
| 10,829,910 B2 | * | 11/2020 | Yoshinada | E02F 9/261 |
| 2005/0027420 A1 | * | 2/2005 | Fujishima | E02F 9/2045 701/50 |

(Continued)

FOREIGN PATENT DOCUMENTS

| | | |
|---|---|---|
| JP | H05-287782 | 11/1993 |
| JP | H06-200537 | 7/1994 |

(Continued)

OTHER PUBLICATIONS

International Search Report for PCT/JP2018/029630 dated Sep. 25, 2018.

*Primary Examiner* — Tyler J Lee
(74) *Attorney, Agent, or Firm* — IPUSA, PLLC

(57) ABSTRACT

A shovel includes a lower traveling body, an upper turning body turnably mounted on the lower traveling body, a cab mounted on the upper turning body, an attachment attached to the upper turning body, and a display device provided in the cab. The display device is configured to display an image. The image includes numerical information items indicating the relationship between two positions of the leading edge of the attachment at two points of time and graphics each corresponding to one of the numerical information items.

15 Claims, 13 Drawing Sheets

(56) References Cited

U.S. PATENT DOCUMENTS

| | | | |
|---|---|---|---|
| 2007/0010925 A1 | 1/2007 | Yokoyama et al. | |
| 2009/0089703 A1 | 4/2009 | Kim et al. | |
| 2013/0158786 A1* | 6/2013 | Fukano | E02F 9/2045 |
| | | | 701/34.4 |
| 2013/0158787 A1* | 6/2013 | Nomura | E02F 9/26 |
| | | | 701/34.4 |
| 2014/0099178 A1* | 4/2014 | Nomura | E02F 9/26 |
| | | | 414/685 |
| 2015/0009329 A1* | 1/2015 | Ishimoto | B60R 1/00 |
| | | | 348/148 |
| 2015/0149049 A1 | 5/2015 | Bewley et al. | |
| 2015/0218781 A1* | 8/2015 | Nomura | G09G 5/37 |
| | | | 701/50 |
| 2017/0089042 A1* | 3/2017 | Machida | H04N 7/181 |
| 2018/0030694 A1 | 2/2018 | Kanari et al. | |
| 2018/0171594 A1* | 6/2018 | Tsuji | G06T 11/60 |
| 2018/0202130 A1 | 7/2018 | Morimoto | |
| 2018/0355585 A1* | 12/2018 | Ohiwa | E02F 9/26 |

FOREIGN PATENT DOCUMENTS

| | | |
|---|---|---|
| JP | 2002-275949 | 9/2002 |
| JP | 2003-300690 | 10/2003 |
| JP | 2009-085003 | 4/2009 |
| JP | 5426743 | 2/2014 |
| JP | 2016-084663 | 5/2016 |
| JP | 2016-204840 | 12/2016 |
| JP | 2017-110472 | 6/2017 |
| WO | 1999/035462 | 7/1999 |
| WO | 2005/024144 | 3/2005 |
| WO | 2017/047654 | 3/2017 |

\* cited by examiner

SHOVEL, DISPLAY DEVICE FOR SHOVEL, AND DISPLAY METHOD FOR SHOVEL

CROSS-REFERENCE TO RELATED APPLICATIONS

This application is a continuation application filed under 35 U.S.C. 111(a) claiming benefit under 35 U.S.C. 120 and 365(c) of PCT International Application No. PCT/JP2018/029630, filed on Aug. 7, 2018 and designating the U.S., which claims priority to Japanese patent application No. 2017-154060, filed on Aug. 9, 2017. The entire contents of the foregoing applications are incorporated herein by reference.

BACKGROUND

Technical Field

The present invention relates to shovels, display devices for shovels, and display methods for shovels.

DESCRIPTION OF RELATED ART

Shovels that display distance information indicating the distance between the leading edge of a bucket and a target work surface and angle information indicating the angle between the target work surface and the bucket on the screen of the display part of a display and input device placed in a cab have been known.

SUMMARY

According to an aspect of the present invention, a shovel includes a lower traveling body, an upper turning body turnably mounted on the lower traveling body, a cab mounted on the upper turning body, an attachment attached to the upper turning body, and a display device provided in the cab. The display device is configured to display an image. The image includes numerical information items indicating the relationship between two positions of the leading edge of the attachment at two points of time and graphics each corresponding to one of the numerical information items.

DETAILED DESCRIPTION

Figure 1:
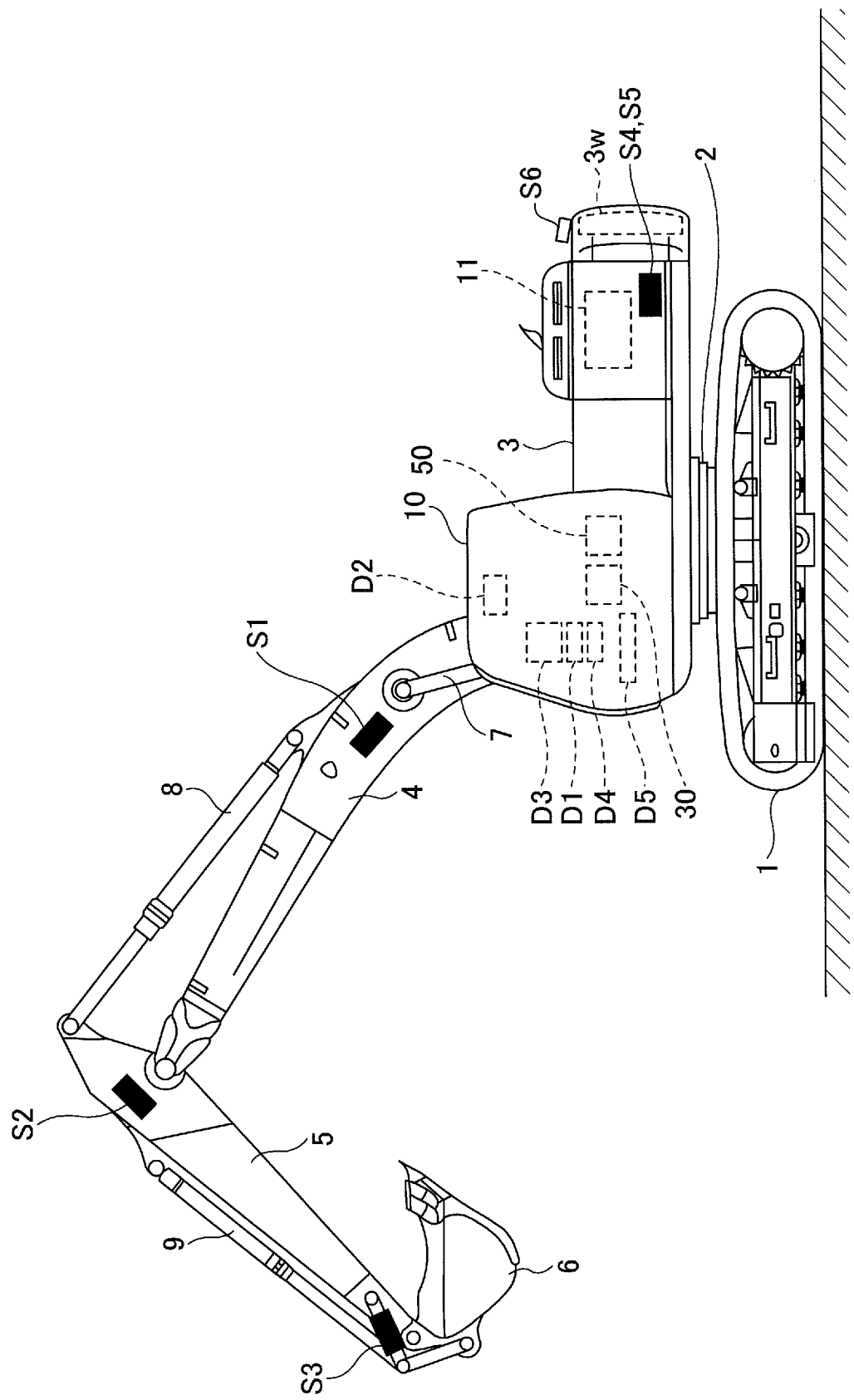
FIG. 1 is a side view of a shovel according to an embodiment of the present invention.

When checking the accuracy of a work surface such as a slope at the time of finishing the work surface, or setting a target work surface, it is necessary to measure the distance and angle between predetermined two points.

According to the above-described shovels, however, although the relative positional relationship between the actual blade edge of the bucket and the target work surface is displayed, no distance or angle between two points is displayed. Therefore, when checking the accuracy of a work surface or setting the target work surface, it is not easy for the operator to check the distance or angle between two points.

Therefore, it is desired to provide a shovel that can improve the visibility of the positional relationship between two points.

According to an embodiment of the present invention, it is possible to provide a shovel that can improve the visibility of the positional relationship between two points.

An embodiment of the invention is described with reference to the drawings. In the drawings, the same components have the same reference numeral, and duplicate description thereof may be omitted.

FIG. 1 is a side view of a shovel (excavator) according to an embodiment of the present invention. An upper turning body 3 is turnably mounted on a lower traveling body 1 of the shovel through a turning mechanism 2. A boom 4 is attached to the upper turning body 3. An arm 5 is attached to the end of the boom 4. A bucket 6 serving as an end attachment is attached to the end of the arm 5. A slope bucket, a dredging bucket, or the like may be used as an end attachment.

The boom 4, the arm 5, and the bucket 6 constitute an excavation attachment that is an example of an attachment, and are hydraulically driven by a boom cylinder 7, an arm cylinder 8, and a bucket cylinder 9, respectively. A boom angle sensor S1 is attached to the boom 4. An arm angle sensor S2 is attached to the arm 5. A bucket angle sensor S3 is attached to the bucket 6. A bucket tilt mechanism may be provided on the excavation attachment.

The boom angle sensor S1 detects the rotation angle of the boom 4. According to this embodiment, the boom angle sensor S1 is an acceleration sensor that detects the rotation angle of the boom 4 relative to the upper turning body 3 by detecting an inclination to a horizontal plane.

The arm angle sensor S2 detects the rotation angle of the arm 5. According to this embodiment, the arm angle sensor S2 is an acceleration sensor that detects the rotation angle of the arm 5 relative to the boom 4 by detecting an inclination to a horizontal plane.

The bucket angle sensor S3 detects the rotation angle of the bucket 6. According to this embodiment, the bucket angle sensor S3 is an acceleration sensor that detects the rotation angle of the bucket 6 relative to the arm 5 by detecting an inclination to a horizontal plane. When the excavation attachment is provided with a bucket tilt mechanism, the bucket angle sensor S3 additionally detects the rotation angle of the bucket 6 about a tilt axis.

The boom angle sensor S1, the arm angle sensor S2, and the bucket angle sensor S3 may alternatively be potentiometers using a variable resistor, stroke sensors that detect the stroke amount of a corresponding hydraulic cylinder, rotary encoders that detect a rotation angle about a link pin, or the like. The boom angle sensor S1, the arm angle sensor S2, and the bucket angle sensor S3 constitute a posture sensor that detects information on the posture of the excavation attachment. The posture sensor may be combined with the output of a gyro sensor to detect information on the posture of the excavation attachment.

A cabin 10 serving as a cab is provided and a power source such as an engine 11 is mounted on the upper turning body 3. A counterweight 3w is provided at the rear end of the upper turning body 3. A body tilt sensor S4, a turning angular velocity sensor S5, and a camera S6 are attached to the upper turning body 3.

The body tilt sensor S4 detects the inclination of the upper turning body 3 to a horizontal plane. According to this embodiment, the body tilt sensor S4 is a two-axis acceleration sensor that detects the tilt angle of the upper turning body 3 around its longitudinal axis and lateral axis. For example, the longitudinal axis and the lateral axis of the upper turning body 3 are perpendicular to each other and pass the center point of the shovel that is a point on the turning axis of the shovel.

The turning angular velocity sensor S5 is, for example, a gyro sensor, and detects the turning angular velocity of the upper turning body 3. The turning angular velocity sensor S5 may alternatively be a resolver, a rotary encoder, or the like. For example, the turning angular velocity sensor S5 may be attached to a center joint provided in association with the turning mechanism 2 that achieves the relative rotation between the lower traveling body 1 and the upper turning body 3.

The camera S6 is a device that obtains an image of an area surrounding the shovel. According to this embodiment, the camera S6 is one or more cameras attached to the upper turning body 3.

An input device D1, an audio output device D2, a display device D3, a storage device D4, a gate lock lever D5, a controller 30, and a machine guidance device 50 are installed in the cabin 10.

The controller 30 operates as a main control part that controls the driving of the shovel. According to this embodiment, the controller 30 is composed of a processing unit including a CPU and an internal memory. The CPU executes a program stored in the internal memory to implement various functions of the controller 30.

The machine guidance device 50 executes a machine guidance function and provides guidance (directions) on shovel operations. According to this embodiment, for example, the machine guidance device 50 visually and aurally notifies an operator of a vertical distance between a target work surface set by the operator and the leading edge position of the bucket 6. The leading edge position of the bucket 6 is, for example, a tooth tip position. According to this configuration, the machine guidance device 50 guides the operator in operating the shovel. The machine guidance device 50 may only visually or only aurally notify the operator of the distance. Specifically, like the controller 30, the machine guidance device 50 is composed of a processing unit including a CPU and an internal memory. The CPU executes a program stored in the internal memory to implement various functions of the machine guidance device 50. The machine guidance device 50 may be incorporated in the controller 30.

The machine guidance device 50 may execute a machine control function to automatically assist the operator in operating the shovel. For example, in the case of executing the machine control function, the machine guidance device 50 assists the operator in moving the boom 4, the arm 5, and the bucket 6 such that the leading edge position of the bucket 6 coincides with the target work surface during an excavating operation. More specifically, for example, during an arm closing operation by the operator, the machine guidance device 50 automatically extends or retracts at least one of the boom cylinder 7 and the bucket cylinder 9 to make the leading edge position of the bucket 6 coincide with the target work surface. In this case, only by operating a single operating lever, the operator can simultaneously move the boom 4, the arm 5, and the bucket 6 to perform excavation work while making the leading edge position of the bucket 6 coincide with the target work surface.

The input device D1 is a device for inputting various kinds of information to the machine guidance device 50 by the operator of the shovel. According to this embodiment, the input device D1 is a membrane switch attached around the display device D3. A touchscreen or the like may be used as the input device D1.

The audio output device D2 outputs various kinds of audio information in response to an audio output command from the machine guidance device 50. According to this embodiment, an in-vehicle loudspeaker directly connected to the machine guidance device 50 is used as the audio output device D2. An alarm such as a buzzer may be used as the audio output device D2.

The display device D3 outputs various kinds of image information in response to a command from the machine guidance device 50. According to this embodiment, an in-vehicle liquid crystal display directly connected to the machine guidance device 50 is used as the display device D3. A camera image captured by the camera S6 is displayed on the display device D3.

The storage device D4 is a device for storing various kinds of information. According to this embodiment, a non-volatile storage medium such as a semiconductor memory is used as the storage device D4. The storage device D4 stores various kinds of information output by the machine guidance device 50, etc., such as design data.

The gate lock lever D5 is a mechanism to prevent the shovel from being accidentally operated. According to this embodiment, the gate lock lever D5 is provided between the door and the operator seat of the cabin 10. When the gate lock lever D5 is pulled up to prevent the operator from getting out of the cabin, various operating apparatuses are enabled. When the gate lock lever D5 is pushed down to allow the operator to get out of the cabin 10, various operating apparatuses are disabled.

Figure 2:
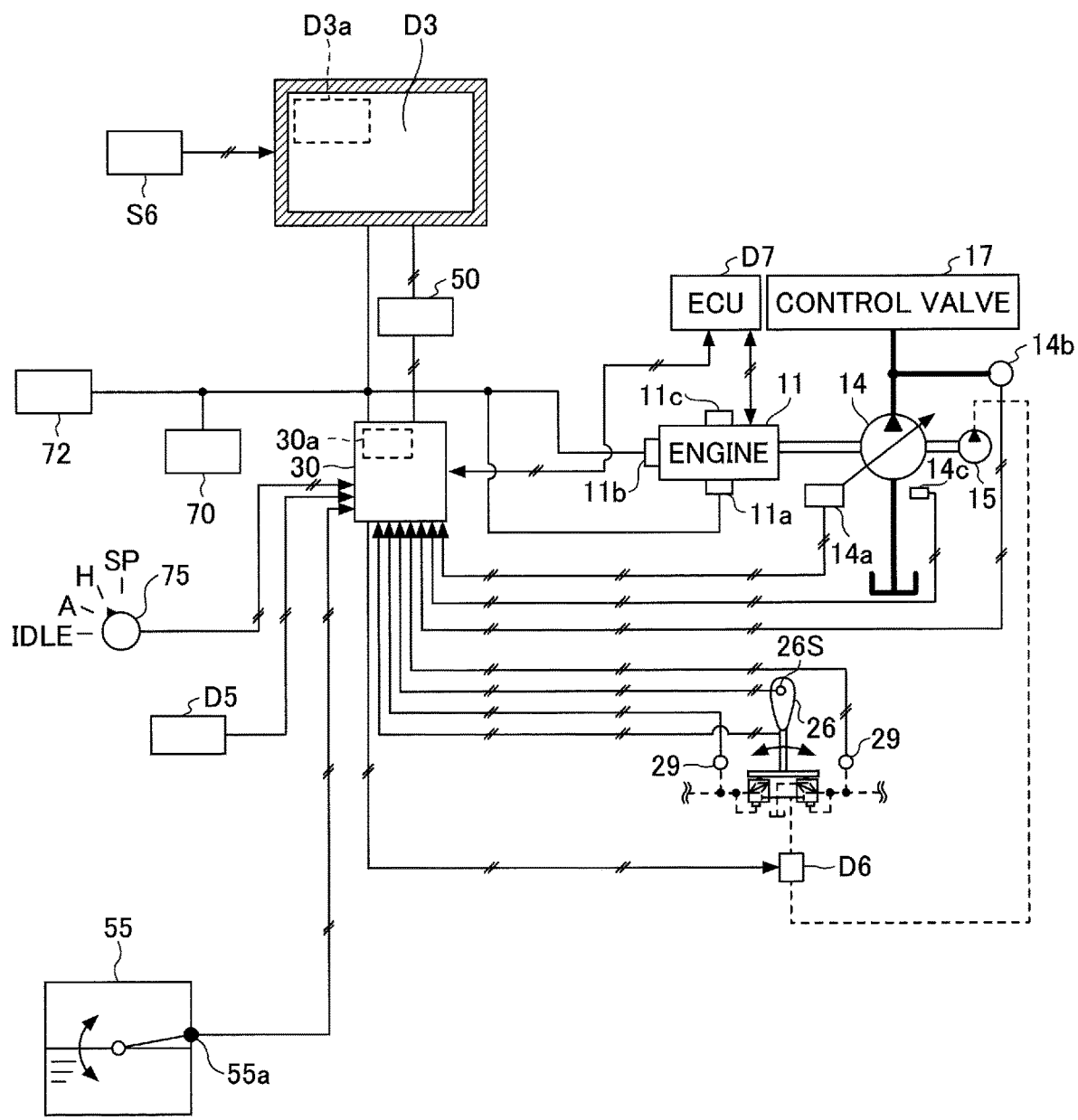
FIG. 2 is a diagram illustrating an example configuration of the drive control system of the shovel of FIG. 1.

FIG. 2 is a diagram illustrating an example configuration of the drive control system of the shovel of FIG. 1. In FIG. 2, a mechanical power system, a high pressure hydraulic line, a pilot line, and an electric drive and control system are indicated by a double line, a thick solid line, a dashed line, and a thin solid line, respectively.

The engine 11 is a drive source of the shovel. According to this embodiment, the engine 11 is a diesel engine that adopts isochronous control to maintain a constant engine rotational speed irrespective of an increase or decrease in an engine load. The amount of fuel injection, the timing of fuel injection, boost pressure, etc., in the engine 11 are controlled by an engine controller unit (ECU) D7.

A main pump 14 and a pilot pump 15 serving as hydraulic pumps have respective rotating shafts connected to the rotating shaft of the engine 11. A control valve 17 is connected to the main pump 14 via a high pressure hydraulic line.

The control valve 17 is a hydraulic controller that controls the hydraulic system of the shovel. Hydraulic actuators such as left and right traveling hydraulic motors, the boom cylinder 7, the arm cylinder 8, the bucket cylinder 9, and a turning hydraulic motor are connected to the control valve 17 through high pressure hydraulic lines.

An operating apparatus 26 is connected to the pilot pump 15 via a pilot line and a gate lock valve D6. The operating apparatus 26 includes operating levers and operating pedals. Furthermore, the operating apparatus 26 is connected to the control valve 17 via a pilot line.

A knob switch serving as a switch 26S is provided at the end of an operating lever serving as the operating apparatus 26. The operator can operate the knob switch serving as the switch 26S with a finger without releasing her/his hand from the operating lever. The switch 26S may alternatively be a pedal switch. In this case, the operator can operate the pedal switch serving as the switch 26S with her/his foot without releasing her/his hand from the operating lever.

The gate lock valve D6 switches opening and closing of a pilot line connecting the pilot pump 15 and the operating apparatus 26. According to this embodiment, the gate lock valve D6 is a solenoid valve that switches opening and closing of the pilot line in response to a command from the controller 30. The controller 30 determines the state of the gate lock lever D5 based on a state signal output by the gate lock lever D5. In response to determining that the gate lock lever D5 is pulled up, the controller 30 outputs an OPEN command to the gate lock valve D6. In response to receiving the OPEN command, the gate lock valve D6 opens to open the pilot line. As a result, the operating apparatus 26 is enabled for the operator's operation. In response to determining that that the gate lock lever D5 is pulled down, the controller 30 outputs a CLOSE command to the gate lock valve D6. In response to receiving the CLOSE command, the gate lock valve D6 closes to close the pilot line. As a result, the operating apparatus 26 is disabled for the operator's operation.

A pressure sensor 29 detects the details of operation of the operating apparatus 26 in the form of pressure. The pressure sensor 29 outputs a detection value to the controller 30.

Furthermore, FIG. 2 illustrates a connection relationship between the controller 30 and the display device D3. According to this embodiment, the display device D3 is connected to the controller 30 via the machine guidance device 50. The display device D3, the machine guidance device 50, and the controller 30 may be connected via a communications network such as a CAN.

The display device D3 includes a conversion part D3a that generates an image. According to this embodiment, the conversion part D3a generates a camera image to be displayed based on the output of the camera S6. The camera S6 is connected to the display device D3 via a dedicated line, for example.

Furthermore, the conversion part D3a generates an image to be displayed based on the output of the controller 30 or the machine guidance device 50. According to this embodiment, the conversion part D3a converts various kinds of information output by the controller 30 or the machine guidance device 50 into an image signal. The output information of the controller 30 includes, for example, data indicating the temperature of engine coolant water, data indicating the temperature of hydraulic oil, data indicating the remaining amount of fuel, and data indicating the remaining amount of an aqueous urea solution. The output information of the machine guidance device 50 includes, for example, data indicating the leading edge position of the bucket 6 and data on a target work surface.

The conversion part D3a may be implemented not as a function of the display device D3 but as a function of the controller 30 or the machine guidance device 50. In this case, the camera S6 is connected to not the display device D3 but the controller 30 or the machine guidance device 50.

The display device D3 is supplied with electric power from a rechargeable battery 70 to operate. The rechargeable battery 70 is charged with electric power generated in an alternator 11a (generator) of the engine 11. The electric power of the rechargeable battery 70 may also be supplied to electrical equipment 72, etc., of the shovel besides the controller 30 and the display device D3. A starter 1ib of the engine 11 may be driven with electric power from the rechargeable battery 70 to start the engine 11.

The engine 11 is controlled by the engine controller unit D7. The engine controller unit D7 constantly transmits various data indicating the condition of the engine 11 to the controller 30. The various data indicating the condition of the engine 11 are an example of the operating information of the shovel, and include, for example, data indicating a coolant water temperature detected at a water temperature sensor 11c serving as an operating information obtaining part. The controller 30 may store the various data indicating the condition of the engine 11 in a temporary storage part (memory) 30a and transmit them to the display device D3 when necessary.

Furthermore, the controller 30 is fed with various data as the operating information of the shovel as follows. The various data are stored in the temporary storage part 30a of the controller 30.

For example, a regulator 14a of the main pump 14, which is a variable displacement hydraulic pump, feeds the controller 30 with data indicating a swash plate tilt angle. Furthermore, a discharge pressure sensor 14b feeds the controller 30 with data indicating the discharge pressure of the main pump 14. These data are stored in the temporary storage part 30a. Furthermore, an oil temperature sensor 14c is provided in a conduit between the main pump 14 and a tank storing hydraulic oil that the main pump 14 draws in. The oil temperature sensor 14c feeds the controller 30 with data representing the temperature of hydraulic oil flowing through the conduit. The regulator 14a, the discharge pressure sensor 14b, and the oil temperature sensor 14c are specific examples of the operating information obtaining part.

Furthermore, a contained fuel amount detecting part 55a in a fuel containing part 55 feeds the controller 30 with data indicating the amount of contained fuel. According to this embodiment, a remaining fuel amount sensor serving as the contained fuel amount detecting part 55a in a fuel tank serving as the fuel containing part 55 feeds the controller 30 with data indicating the state of the remaining amount of fuel.

Specifically, the remaining fuel amount sensor is composed of a float that follows a liquid surface and a variable resistor (potentiometer) that converts a vertical variation of the float into a resistance value. This configuration makes it possible for the remaining fuel amount sensor to have the state of the remaining amount of fuel steplessly displayed on the display device D3. The detection method of the contained fuel amount detecting part 55a may be suitably selected in accordance with a usage environment, etc. A detection method that makes it possible to display the amount of remaining fuel in a stepwise manner may be adopted. These configurations may also be applied to an aqueous urea solution tank.

The pressure sensor 29 detects a pilot pressure that acts on the control valve 17 when the operating apparatus 26 is operated. The pressure sensor 29 feeds the controller 30 with data indicating the detected pilot pressure.

According to this embodiment, the shovel has an engine rotational speed adjustment dial 75 provided in the cabin 10. The engine rotational speed adjustment dial 75 is a dial for adjusting the rotational speed of the engine 11, and enables the engine rotational speed to be switched among four levels. The engine rotational speed adjustment dial 75 transmits data indicating the setting of the engine rotational speed to the controller 30. The engine rotational speed adjustment dial 75 can switch the engine rotational speed among the four levels of SP mode, H mode, A mode, and idling (IDLE) mode. FIG. 2 illustrates a state where the H mode is selected by the engine rotational speed adjustment dial 75.

The SP mode is a rotational speed mode selected when it is desired to prioritize workload, and uses the highest engine rotational speed. The H mode is a rotational speed selected when it is desired to balance workload and fuel efficiency, and uses the second highest engine rotational speed. The A mode is a rotational speed selected when it is desired to operate the shovel at low noise while prioritizing fuel efficiency, and uses the third highest engine rotational speed. The idling mode is a rotational speed selected when it is desired to idle the engine 11, and uses the lowest engine rotational speed. The engine 11 is controlled to a constant rotational speed at the engine rotational speed of the rotational speed mode set by the engine rotational speed adjustment dial 75.

Figure 3:
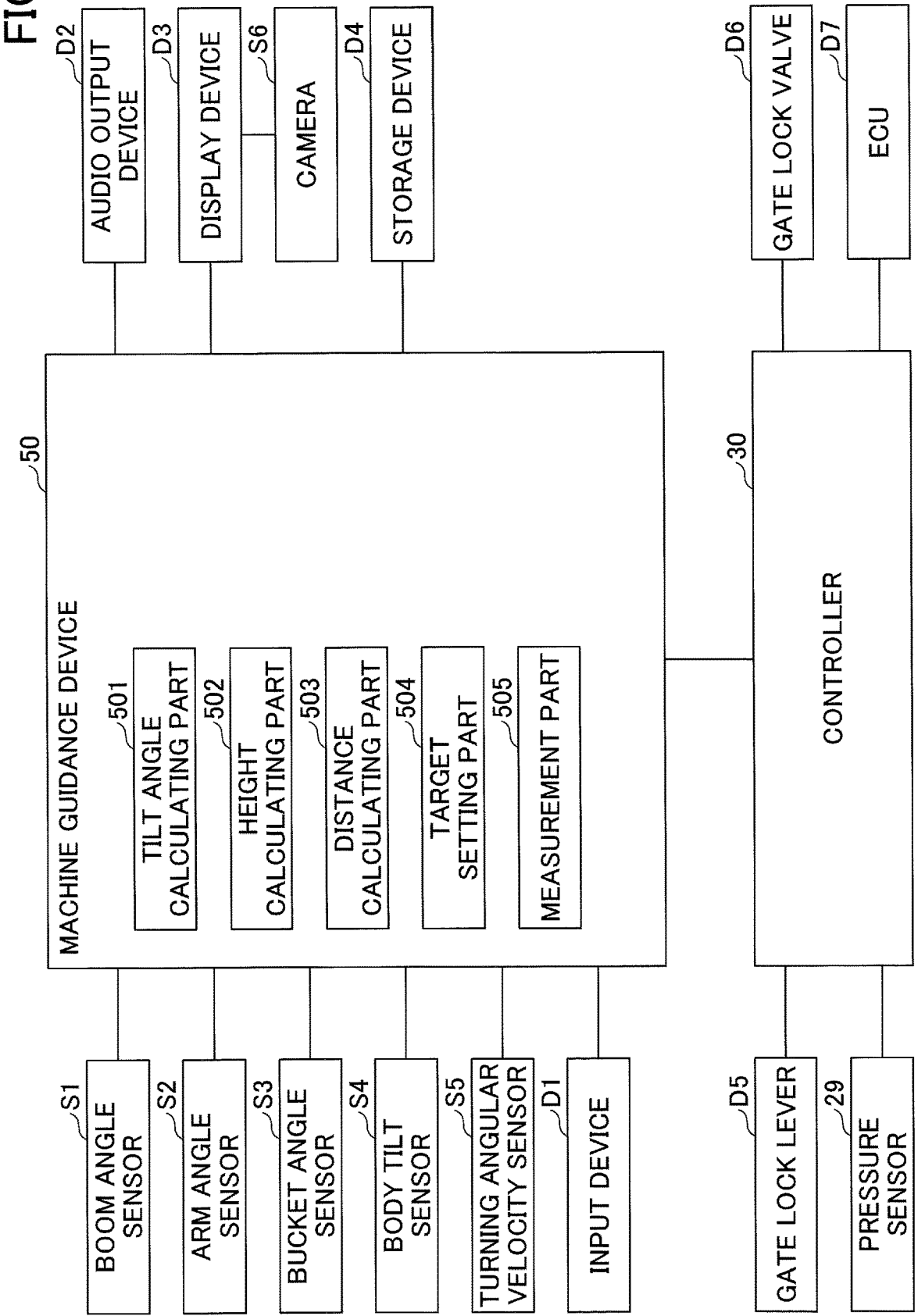
FIG. 3 is a block diagram illustrating an example configuration of a machine guidance device.

Next, various functional elements of the machine guidance device 50 are described with reference to FIG. 3. FIG. 3 is a block diagram illustrating an example configuration of the machine guidance device 50.

The machine guidance device 50 receives the output information of the boom angle sensor S1, the arm angle sensor S2, the bucket angle sensor S3, the body tilt sensor S4, the turning angular velocity sensor S5, the input device D1, the controller 30, etc. The machine guidance device 50 executes various operations based on the received information and information stored in the storage device D4 and outputs the operation results to the audio output device D2, the display device D3, etc.

For example, the machine guidance device 50 calculates the height of the working part of the attachment and outputs a control command commensurate with the size of the distance between the height of the working part and a predetermined target height to at least one of the audio output device D2 and the display device D3. In response to receiving the control command, the audio output device D2 outputs audio that represents the size of the distance. In response to receiving the control command, the display device D3 displays an image that represents the size of the distance. The target height is a concept including a target depth, and is a height that the operator inputs as a vertical distance relative to a reference position after causing the working part to contact the reference position, for example. The reference position typically has a known latitude, longitude, and altitude. Hereinafter, information on the size of the distance between the height of the working part of the attachment and the target height displayed on the display device D3 is referred to as "working part guidance information." The operator can proceed with work while checking the transition of the size of the distance by looking at the working part guidance information.

To perform the above-described guidance, the machine guidance device 50 includes a tilt angle calculating part 501, a height calculating part 502, a distance calculating part 503, a target setting part 504, and a measurement part 505.

The tilt angle calculating part 501 calculates the tilt angle of the shovel, which is the tilt angle of the upper turning body 3 relative to a horizontal plane, based on a detection signal from the body tilt sensor S4.

The height calculating part 502 calculates the height of the working part of the attachment relative to a reference plane based on the tilt angle calculated by the tilt angle calculating part 501 and the angles of the boom 4, the arm 5, and the bucket 6 calculated from the detection signals of the boom angle sensor S1, the arm angle sensor S2, and the bucket angle sensor S3, respectively. The reference plane is, for example, a virtual plane including a plane in which the shovel is positioned. According to this embodiment, because excavation is performed with the leading edge of the bucket 6, the leading edge (tooth tip) of the bucket 6 corresponds to the working part of the attachment. In the case of performing work such as leveling soil with the back surface of the bucket 6, the back surface of the bucket 6 corresponds to the working part of the attachment.

The distance calculating part 503 calculates the distance between the height of the working part calculated by the height calculating part 502 and a target height. According to this embodiment, the distance calculating part 503 calculates the distance between the height of the leading edge (tooth tip) of the bucket 6 calculated by the height calculating part 502 and the target height.

The target setting part 504 sets a target value used by the machine guidance function or the machine control function. The target setting part 504 sets the target value based on information on the positions of a predetermined portion of the excavation attachment at two points of time. For example, based on the position coordinates of the leading edge of the bucket 6 at two points of time, the target setting part 504 calculates the angle formed between a virtual straight line passing through these two coordinate points and a horizontal plane, and sets the angle as a target slope angle. Each of the two points of time is a point of time at which a predetermined condition is satisfied, and includes, for example, a point of time at which a predetermined switch is depressed, and a point of time at which a predetermined time has passed with the excavation attachment remaining stationary. The target slope angle may include zero degrees.

Furthermore, the target setting part 504 displays geometric information on the display device D3, using information on the positions of a predetermined portion of the excavation attachment at two points of time. The geometric information is information on the results of measurement by the shovel. For example, based on the position coordinates of the leading edge of the bucket 6 at two points of time, the target setting part 504 displays the angle formed between a virtual straight line passing through these two coordinate points and a horizontal plane as geometric information on the display device D3. The two coordinate points may be directly displayed as geometric information, and the horizontal distance and the vertical distance between the two coordinate points may be displayed as geometric information. Here, of the two points of time, a first point of time is a point of time at which a predetermined condition is satisfied as described above. Of the two points of time, a second point of time is a current point of time. Thus, the geometric information is displayed in order to have the operator understand the positional relationship between the coordinate point of the predetermined portion recorded at the first point of time and the coordinate point of the predetermined portion at the current point of time.

The measurement part 505 calculates numerical information indicating the relationship between the positions of a predetermined portion of the excavation attachment at two points of time, based on information on the positions of the predetermined portion of the excavation attachment at the two points of time. For example, the measurement part 505 calculates the numerical information of the positional relationship between two coordinate points, such as the horizontal distance, vertical distance, straight-line distance, slope angle, etc., between the two coordinate points, based on the position information of the leading edge of the bucket 6 at two points of time.

Furthermore, with respect to each item of the calculated numerical information, the measurement part 505 displays a graphic corresponding to the numerical information, using information on the positions of a predetermined portion of the excavation attachment at two points of time. For example, based on the position coordinates of the leading edge of the bucket 6 at two points of time, the measurement part 505 displays a corresponding graphic with respect to each of the horizontal distance, vertical distance, straight-line distance, slope angle, etc., between the two coordinate points.

Figure 4:
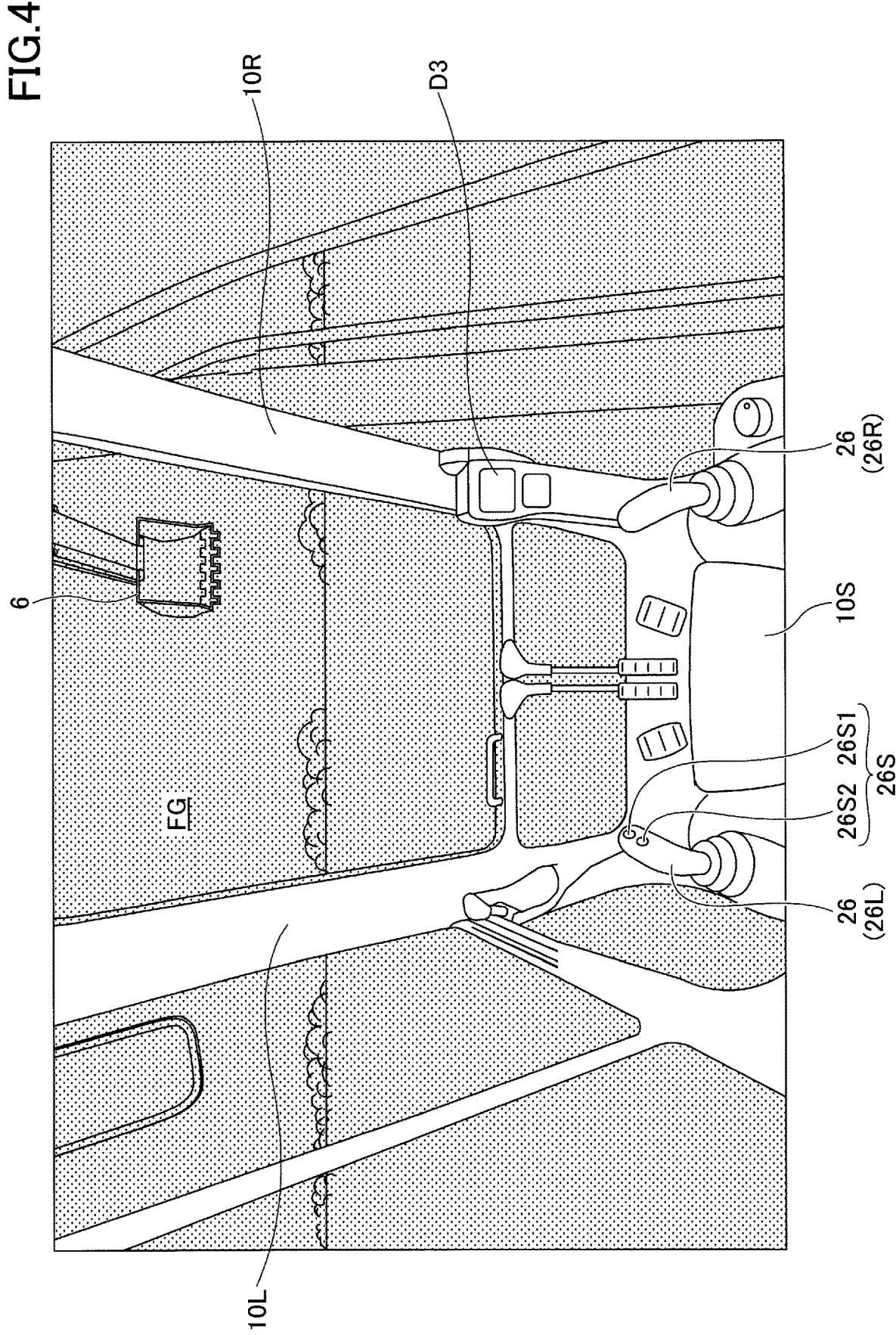
FIG. 4 is a perspective view of the inside of a cabin.

Next, examples of the attachment positions of various devices provided in the cabin 10 are described with reference to FIG. 4. FIG. 4 is a perspective view of the inside of the cabin 10, illustrating a forward looking view from an operator seat 10S of the shovel. According to the illustration of FIG. 4, of a right pillar 10R on the front right and a left pillar 10L on the front left of the operator seat 10S, the display device D3 is attached to the right pillar 10R in such a manner as to fit within the width of the right pillar 10R. This is for enabling the operator sitting in the operator seat 10S facing the front to look at the display device D3 during work, specifically, for enabling the operator to capture the display device D3 in her/his peripheral vision when having the bucket 6 in the center of her/his visual field through a windshield FG.

Operating levers serving as the operating apparatus 26 include a left operating lever 26L and a right operating lever 26R. The switch 26S is provided at the end of the left operating lever 26L. The operator can operate the switch 26S with a finger without releasing her/his hand from the operating lever. The switch 26S may alternatively be provided at the end of the right operating lever 26R or provided at the end of each of the left operating lever 26L and the right operating lever 26R.

According to the illustration of FIG. 4, the switch 26S includes a reference setting button 26S1 and a measurement mode button 26S2. The reference setting button 26S1 is a button for setting a reference position. The measurement mode button 26S2 is a button for starting or ending a measurement mode.

The measurement mode is one of the operating modes of the shovel. The operating modes of the shovel include the measurement mode and a guidance mode.

The measurement mode is an operating mode that is selected when performing measurement using the shovel. According to this embodiment, the measurement mode starts when the measurement mode button 26S2 is depressed. For example, the measurement mode is selected when measuring the positional relationship between predetermined two points or when setting a target value used in the machine guidance function or the machine control function.

The guidance mode is an operating mode that is selected when executing the machine guidance function or the machine control function. According to this embodiment, the guidance mode starts when a guidance mode button (not depicted) is depressed. The guidance mode is selected, for example, when forming a slope with the shovel.

Figure 5:
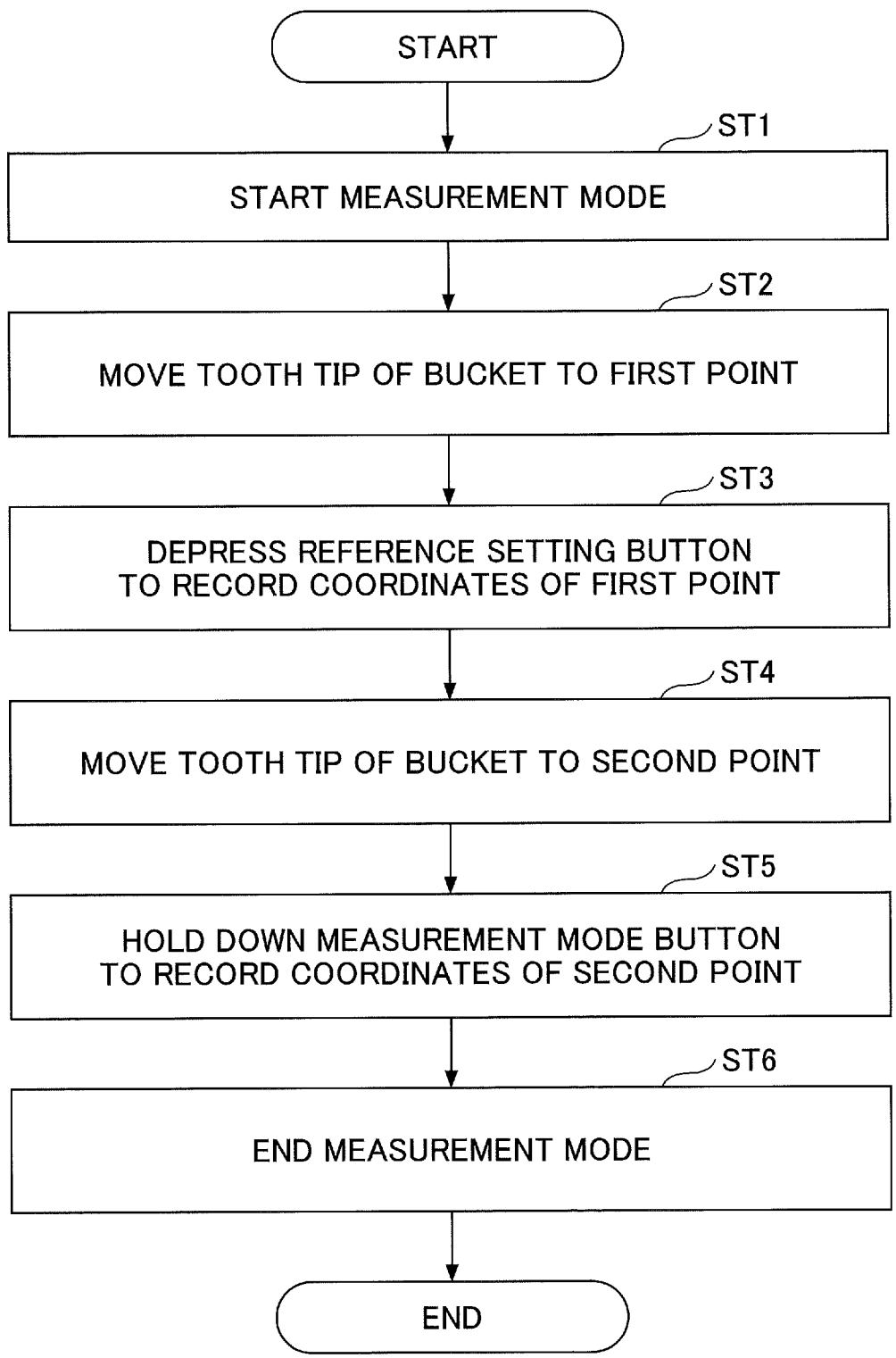
FIG. 5 is a flowchart of an operation procedure for determining whether a slope is formed with a desired accuracy.
Figure 6:
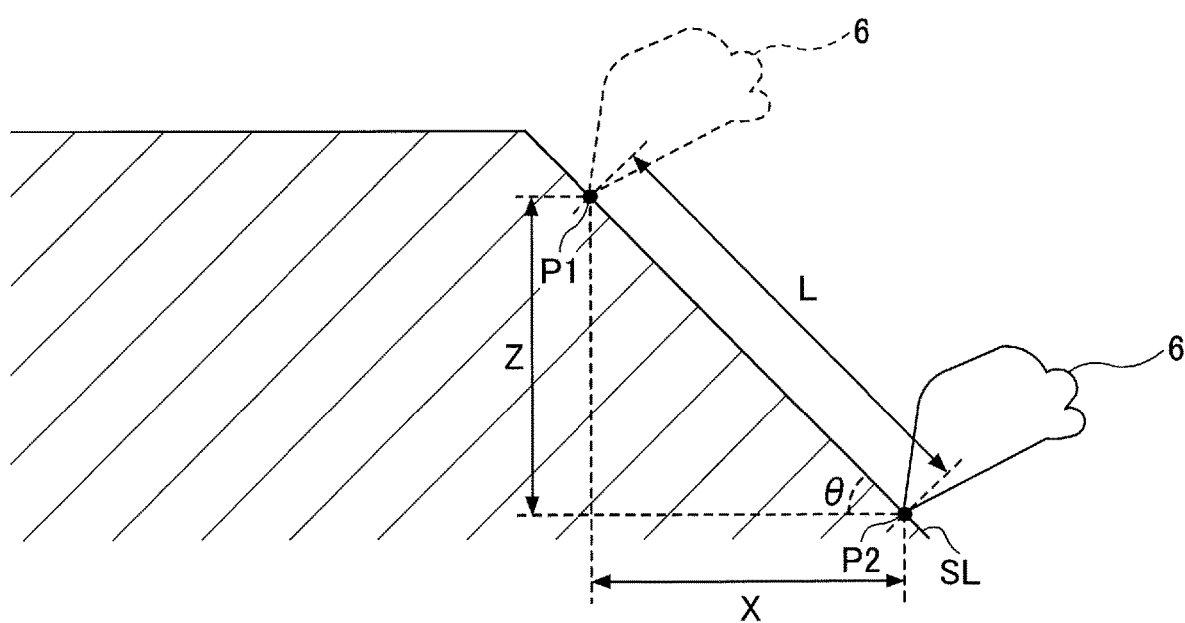
FIG. 6 is a sectional view of a formed slope.

Next, a method of determining whether a slope is formed with a desired accuracy during work or after work is described with reference to FIGS. 5 and 6. FIG. 5 is a flowchart of an operation procedure for determining whether a slope is formed with a desired accuracy. FIG. 6 is a sectional view of a formed slope. The bucket 6 indicated by the dashed line of FIG. 6 illustrates the state of the bucket 6 at a first point of time of the formed slope, and the bucket 6 indicated by the solid line of FIG. 6 illustrates the state of the bucket 6 at a second point of time of the formed slope.

First, the operator starts the measurement mode (step ST1). For example, the operator depresses the measurement mode button 26S2 of the left operating lever 26L to start the measurement mode.

Thereafter, as illustrated in FIG. 6, the operator causes a tooth tip of the bucket 6 to coincide with a first point P1 of a formed slope SL (step ST2). For example, the operator operates the left operating lever 26L and the right operating lever 26R to move the excavation attachment, and causes a tooth tip of the bucket 6 to contact the first point P1 of the formed slope SL. The controller 30 calculate the position of the tooth tip of the bucket 6 as the coordinates of the first point P1, using the output of the posture sensor.

Thereafter, the operator depresses the reference setting button 26S1 of the left operating lever 26L to record the coordinates of the first point P1 (step ST3). For example, the operator depresses the reference setting button 26S1 while keeping the tooth tip of the bucket 6 in contact with the first point P1 to record the coordinates of the first point P1 as the origin. The operator may alternatively record the coordinates of the first point P1 as the origin by making the excavation attachment stationary for a predetermined period while keeping the tooth tip of the bucket 6 in contact with the first point P1. The coordinates of the first point P1 may alternatively be recorded as, for example, coordinates relative to reference coordinates such as the coordinates of a point on the turning axis of the shovel or the coordinates of a point on a boom foot pin. The reference coordinates may be set according to the world geodetic system, for example. The world geodetic system is a three-dimensional Cartesian coordinate system with the origin at the center of mass of the Earth, the X-axis oriented toward the point of intersection of the prime meridian and the equator, the Y-axis oriented toward 90 degrees east longitude, and the Z-axis oriented toward the Arctic pole. Furthermore, any point at a work site may be set as the origin, and the positions of the first point P1 and the second point P2 may be measured based on a relative positional relationship with the point set as the origin.

Thereafter, the operator moves the tooth tip of the bucket 6 to the second point P2 of the formed slope SL (step ST4). For example, the operator operates the left operating lever 26L and the right operating lever 26R to move the excavation attachment to cause the tooth tip of the bucket 6 to contact the second point P2 of the formed slope SL. The controller 30 can calculate the position of the tooth tip of the bucket 6 as the coordinates of the second point P2, using the output of the posture sensor.

Thereafter, the operator holds down the measurement mode button 26S2 of the left operating lever 26L to record the coordinates of the second point P2 (step ST5). For example, the operator holds down the measurement mode button 26S2 while keeping the tooth tip of the bucket 6 in contact with the second point P2 to record the coordinates of the second point P2 as coordinates relative to the coordinates of the first point P1. The operator may alternatively record the coordinates of the second point P2 as coordinates relative to the coordinates of the first point P1 by making the excavation attachment stationary for a predetermined period while keeping the tooth tip of the bucket 6 in contact with the second point P2. The coordinates of the second point P2 may alternatively be recorded as, for example, coordinates relative to the reference coordinates. Furthermore, while the coordinates of the second point P2 are recorded in distinction from the coordinates of the first point P1 by holding down the measurement mode button 26S2 in the above-described example, the coordinates of the second point P2 may be recorded by a method other than holding down. For example, the coordinates of the first point P1 and the coordinates of the second point P2 may be recorded in distinction from each other by changing the number of times the button is pressed. Specifically, the coordinates of the first point P1 may be recorded in response to a single click on the button, and the coordinates of the second point P2 may be recorded in response to a double click on the button. In this case, the same button may be used to record the coordinates of the first point P1 and the coordinates of the second point P2. The coordinates of the second point P2 may be recorded by holding down or double-clicking the reference setting button 26S1. Furthermore, if it is possible to recognize the recording of the coordinates of the first point P1 from audio output or display, the operator may simply record the coordinates of the first point P1 by the first depression of the reference setting button 26S1 and record the coordinates of the second point P2 by the second depression of the reference setting button 26S1. Furthermore, in addition to the reference setting button 26S1 and the measurement mode button 26S2, a third button may be provided. In this case, the operator can depress the measurement mode button 26S2 to start the measurement mode, depress the reference setting button 26S1 to record the coordinates of the first point P1, and depress the third button to record the coordinates of the second point P2.

The machine guidance device 50 calculates information on the positional relationship between two points, such as a horizontal distance X, a vertical distance Z, a straight-line distance L, and a slope angle θ between the first point P1 and the second point P2, based on the coordinates of the first point P1 and the coordinates of the second point P2. Thereafter, the machine guidance device 50 outputs a control command including numerical information such as the calculated horizontal distance X, vertical distance Z, straight-line distance L, and slope angle θ and information on icons each corresponding to one of the numerical information items to the display device D3. In response to receiving the control command, the display device D3 displays numerical values such as the horizontal distance X, the vertical distance Z, the straight-line distance L, and the slope angle θ together with the icons serving as their respective corresponding graphics. This makes it possible for the operator to easily determine whether the slope SL is formed with a desired accuracy by looking at the display device D3 during work or after work. Furthermore, the operator can determine, based on the positional relationship measured with the measurement mode, whether a worked surface is acceptable compared with a target work surface. This increases work efficiency.

Thereafter, the operator ends the measurement mode (step ST6).

Figure 7:
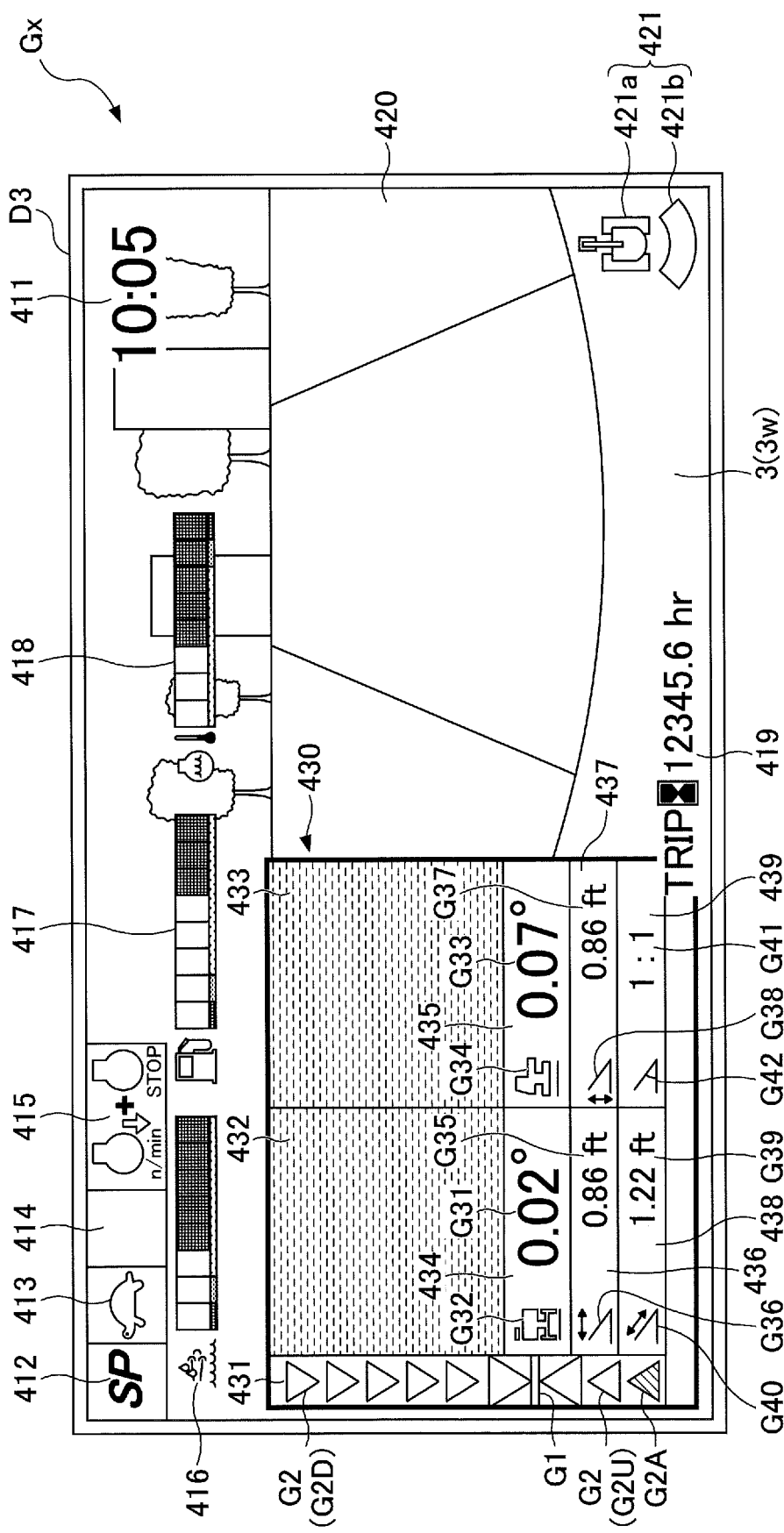
FIG. 7 is a diagram illustrating a first example layout of an output image displayed on a display device during a measurement mode.
Figure 8:
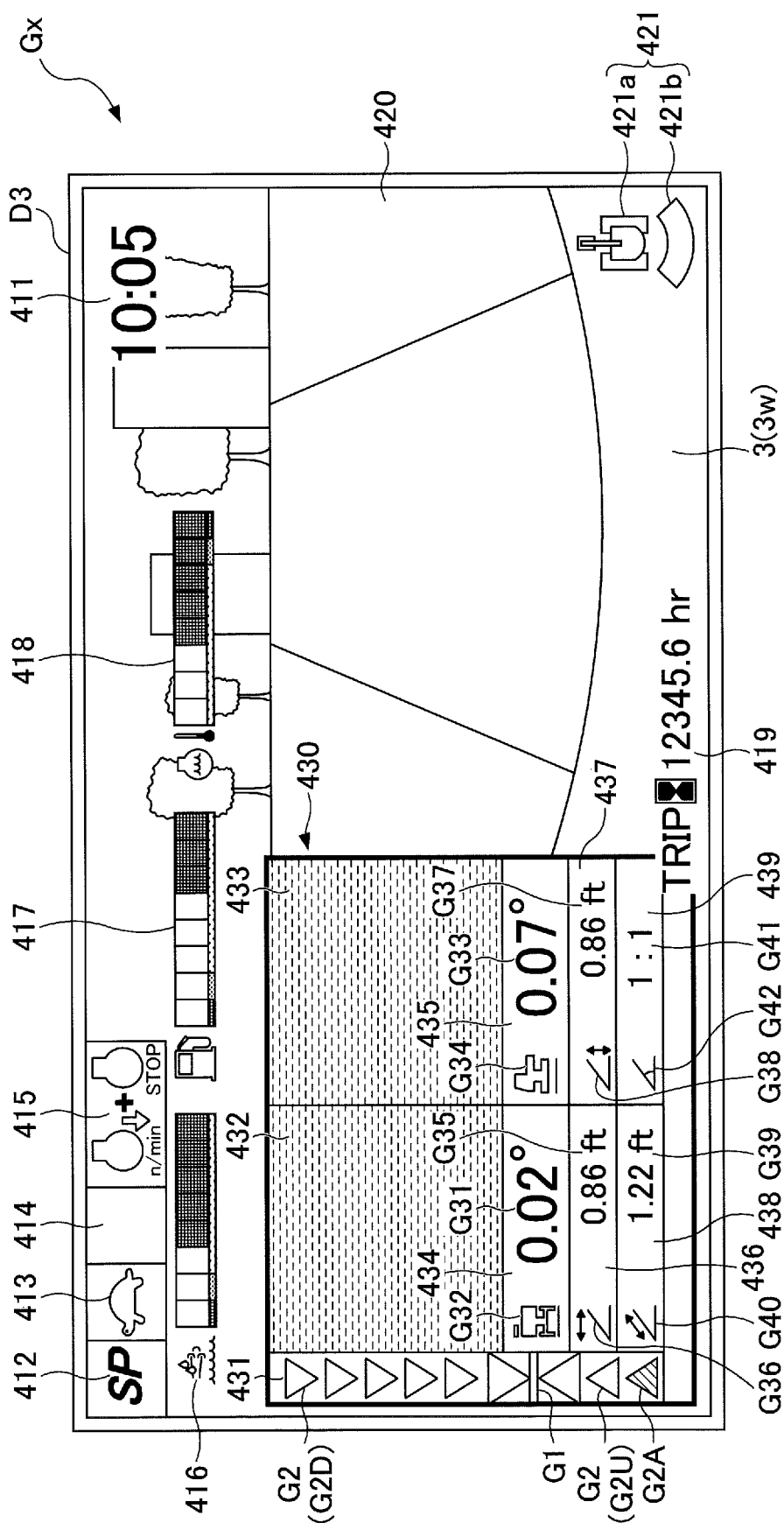
FIG. 8 is another diagram illustrating the first example layout of the output image displayed on the display device during the measurement mode.

Next, a first example layout of an output image Gx displayed during the measurement mode is described with reference to FIGS. 7 and 8. FIGS. 7 and 8 are diagrams illustrating a first example layout of the output image Gx displayed on the display device D3 during the measurement mode.

As illustrated in FIG. 7, the output image Gx displayed on the display device D3 includes a time display part 411, a rotational speed mode display part 412, a travel mode display part 413, an attachment display part 414, an engine control status display part 415, a remaining aqueous urea solution amount display part 416, a remaining fuel amount display part 417, a coolant water temperature display part 418, an engine operating time display part 419, a camera image display part 420, and a work guidance display part 430. The rotational speed mode display part 412, the travel mode display part 413, the attachment display part 414, and the engine control status display part 415 are a display part to display information on the settings of the shovel. The remaining aqueous urea solution amount display part 416, the remaining fuel amount display part 417, the coolant water temperature display part 418, and the engine operating time display part 419 are a display part to display information on the operating condition of the shovel. Images displayed in the parts are generated by the conversion part D3a of the display device D3, using various kinds of data transmitted from the controller 30 or the machine guidance device 50 and a camera image transmitted from the camera S6.

The time display part 411 displays a current time. In the illustration of FIG. 7, a digital display is employed, and the current time (10:05) is displayed.

The rotational speed mode display part 412 displays a rotational speed mode set by the engine rotational speed adjustment dial 75 in image form as operating information of the shovel. Examples of rotational speed modes include the above-described four modes, namely, SP mode, H mode, A mode, and idling mode. According to the illustration of FIG. 7, a symbol "SP" representing SP mode is displayed.

The travel mode display part 413 displays a travel mode as operating information of the shovel. The travel mode represents the setting of traveling hydraulic motors using a variable displacement motor. For example, the travel mode includes a low-speed mode and a high-speed mode. A "turtle"-shaped mark is displayed in the low-speed mode, and a "rabbit"-shaped mark is displayed in the high-speed mode. According to the illustration of FIG. 7, the "turtle"-shaped mark is displayed to make it possible for the operator to recognize that the low-speed mode is set.

The attachment display part 414 displays an image representing an attachment that is attached as operating information of the shovel. Various attachments such as the bucket 6, a rock drill, a grapple, and a lifting magnet are attachable to the shovel. The attachment display part 414 displays, for example, marks shaped like these end attachments and numbers corresponding to the end attachments. According to the illustration of FIG. 7, because the bucket 6, which is standard as an end attachment, is attached, the attachment display part 414 is blank. When a rock drill is attached as an end attachment, a rock drill-shaped mark is displayed in the attachment display part 414, together with a number representing the magnitude of the output of the rock drill, for example.

The engine control status display part 415 displays the control status of the engine 11 as operating information of the shovel. According to the illustration of FIG. 7, "automatic deceleration and automatic stop mode" is selected as the control status of the engine 11. The "automatic deceleration and automatic stop mode" means a control status to automatically reduce the engine rotational speed and further to automatically stop the engine 11 in accordance with the duration of a non-operating condition. Other control statuses of the engine 11 include "automatic deceleration mode," "automatic stop mode," and "manual deceleration mode."

The remaining aqueous urea solution amount display part 416 displays the status of the remaining amount of an aqueous urea solution stored in an aqueous urea solution tank in image form as operating information of the shovel. According to the illustration of FIG. 7, a bar gauge representing the current status of the remaining amount of an aqueous urea solution is displayed. The remaining amount of an aqueous urea solution is displayed based on the output data of a remaining aqueous urea solution amount sensor provided in the aqueous urea solution tank.

The remaining fuel amount display part 417 displays the status of the remaining amount of fuel stored in a fuel tank as operating information of the shovel. According to the illustration of FIG. 7, a bar gauge representing the current status of the remaining amount of fuel is displayed. The remaining amount of fuel is displayed based on the output data of a remaining fuel amount sensor provided in the fuel tank.

The coolant water temperature display part 418 displays the temperature condition of engine coolant water as operating information of the shovel. According to the illustration of FIG. 7, a bar gauge representing the temperature condition of engine coolant water is displayed. The temperature of engine coolant water is displayed based on the output data of the water temperature sensor 11*c* provided on the engine 11.

The engine operating time display part 419 displays the cumulative operating time of the engine 11 as operating information of the shovel. According to the illustration of FIG. 7, a cumulative operating time since the restart of counting by the operator is displayed together with a unit "hr (hour)." A lifelong operating time in the entire period after the manufacture of the shovel or a section operating time since the restart of counting by the operator is displayed in the engine operating time display part 419.

The camera image display part 420 displays an image captured by the camera S6. According to the illustration of FIG. 7, an image captured by a back camera attached to the rear end of the upper surface of the upper turning body 3 is displayed in the camera image display part 420. A camera image captured by a left side camera attached to the left end of the upper surface of the upper turning body 3 or a right side camera attached to the right end of the upper surface of the upper turning body 3 may be displayed in the camera image display part 420. Images captured by two or more of the left side camera, the right side camera, and the back camera may be displayed side by side in the camera image display part 420. A composite image of multiple camera images captured by at least two of the left side camera, the right side camera, and the back camera may be displayed in the camera image display part 420. The composite image may be, for example, an overhead view image.

Each camera is installed such that part of the upper turning body 3 is included in the camera image. The operator has a better sense of distance between an object displayed in the camera image display part 420 and the shovel because of inclusion of part of the upper turning body 3 in the displayed image.

In the camera image display part 420, a camera icon 421 representing the orientation of the camera S6 that has captured a camera image that is being displayed is displayed. The camera icon 421 includes a shovel icon 421*a* representing the shape of the shovel and a strip-shaped orientation indicator icon 421*b* representing the orientation of the camera S6 that has captured the camera image that is being displayed. The camera icon 421 is a display part to display information on the settings of the shovel.

According to the illustration of FIG. 7, the orientation indicator icon 421*b* is displayed below the shovel icon 421*a* (on the opposite side from the attachment) to indicate that an image of an area behind the shovel captured by the back camera is displayed in the camera image display part 420. For example, when an image captured by the right side camera is displayed in the camera image display part 420, the orientation indicator icon 421*b* is displayed to the right of the shovel icon 421*a*. For example, when an image captured by the left side camera is displayed in the camera image display part 420, the orientation indicator icon 421*b* is displayed to the left of the shovel icon 421*a*.

For example, the operator can switch an image displayed in the camera image display part 420 to an image captured by another camera or the like by depressing an image change switch provided in the cabin 10. If the shovel is not provided with the camera S6, different information may be displayed instead of the camera image display part 420.

The work guidance display part 430 displays guidance information for various kinds of work. According to the illustration of FIG. 7, the work guidance display part 430 includes a position indicator image 431, a first target work surface display image 432, a second target work surface display image 433, a right-left body tilt display image 434, a front-rear body tilt display image 435, a horizontal distance display image 436, a vertical distance display image 437, a straight-line distance display image 438, and an angle display image 439, which display teeth tips guidance information that is an example of the working part guidance information. The first target work surface display image 432, the second target work surface display image 433, the right-left body tilt display image 434, the front-rear body tilt display image 435, the horizontal distance display image 436, the vertical distance display image 437, the straight-line distance display image 438, and the angle display image 439 are positioned in respective different areas. The right-left body tilt display image 434 and the front-rear body tilt display image 435 are a display part to display information on the body tilt condition of the shovel. The horizontal distance display image 436, the vertical distance display image 437, the straight-line distance display image 438, and the angle display image 439 are a display part to display an image including numerical information indicating the relationship between predetermined two points and graphics each corresponding to one of the numerical information items. Therefore, the horizontal distance display image 436, the vertical distance display image 437, the straight-line distance display image 438, and the angle display image 439 are also referred to as a measurement mode screen.

The position indicator image 431 is an image that represents a change in the size of a relative distance from the working part (leading edge) of the bucket 6 to a target work surface by changing an indicator position based on a change in the display position of the working part (leading edge) of the bucket 6 relative to the display position of the target work surface. According to the illustration of FIG. 7, the position indicator image 431 is a bar gauge of vertically arranged graphics (segments). The position indicator image 431 includes a target segment G1 and multiple segments G2.

The target segment G1 is a graphic representing the position of the target work surface. According to this embodiment, the target segment G1 is a graphic (straight line) indicating that the relative distance from the working part (leading edge) of the bucket 6 to the target work surface is within a predetermined range. The predetermined range is a range preset as an appropriate relative distance range. That the relative distance is within the predetermined range means that the working part of the bucket 6 is at an appropriate position.

Each segment G2 is a graphic corresponding to a predetermined relative distance. A segment G2 corresponding to a smaller relative distance is placed closer to the target segment G1. A segment G2 corresponding to a greater relative distance is placed farther from the target segment G1. Each segment G2 represents the direction of movement of the bucket 6 as well as the relative distance. The direction of movement of the bucket 6 is a direction to move the working part of the bucket 6 toward the target work surface. According to this embodiment, a segment G2D indicates that the bucket 6 is moved downward to approach the target work surface, and a segment G2U indicates that the bucket 6 is moved upward to approach the target work surface.

The position indicator image 431 displays a segment G2 corresponding to the actual relative distance from the working part (leading edge) of the bucket 6 to the target work surface in a predetermined color different from the color of the other segments G2. The segment G2 displayed in a color different from the color of the other segments G2 is referred to as a segment G2A. The position indicator image 431 indicates the relative distance and the direction of movement by displaying the segment G2A in a predetermined color. As the relative distance from the working part (leading edge) of the bucket 6 to the target work surface becomes greater, a segment G2 more distant from the target segment G1 is displayed in a predetermined color as the segment G2A. As the relative distance from the working part (leading edge) of the bucket 6 to the target work surface becomes smaller, a segment G2 closer to the target segment G1 is displayed in a predetermined color as the segment G2A. Thus, the segment G2A is so displayed as to vertically change the position as the relative distance changes.

When the relative distance is greater than the maximum value of the predetermined range, the segment G2A is displayed in a first color. The first color is, for example, an inconspicuous color such as white or yellow. This is because when the relative distance is greater than the maximum value of the predetermined range, there is little need to alert the operator. Furthermore, when the relative distance is within the predetermined range, the segment G2A is displayed in a second color. The second color is a conspicuous color such as green. This is for notifying the operator that the bucket 6 is at an appropriate position in an easy-to-understand manner. Furthermore, when the relative distance is smaller than the minimum value of the predetermined range, the segment G2A is displayed in a third color. The third color is a conspicuous color such as red. This is for alerting the operator that the target work surface may be excessively scraped by the working part of the bucket 6.

When the actual relative distance of the bucket 6 is within the predetermined range, the position indicator image 431 displays the target segment G1 in a predetermined color different from the color of the other segments. That is, the position indicator image 431 indicates that the relative distance is within the predetermined range by displaying the target segment G1 in a predetermined color. The target segment G1 is preferably displayed in the above-described second color. This is for notifying the operator that the bucket 6 is at an appropriate position in an easy-to-understand manner.

While the segment G2A and the target segment G1 are displayed in a predetermined color, the other segments G2 may be displayed in an inconspicuous color (color equal or similar to a background color) or may not be displayed.

The first target work surface display image 432 schematically shows the relationship between the bucket 6 and the target work surface as the teeth tips guidance information when the guidance mode is selected. When the measurement mode is selected, the first target work surface display image 432 may either schematically show the relationship between the bucket 6 and the target work surface as the teeth tips guidance information or not show the relationship between the bucket 6 and the target work surface. The illustration of FIG. 7 shows the case where the first target work surface display image 432 is hatched and does not show the relationship between the bucket 6 and the target work surface.

When the guidance mode is selected, the second target work surface display image 433 schematically shows the relationship between the bucket 6 and the target work surface as viewed by the operator seated in the cabin 10 and looking forward from the shovel as the teeth tips guidance information. When the measurement mode is selected, the second target work surface display image 433 may either schematically show the relationship between the bucket 6 and the target work surface as viewed by the operator seated in the cabin 10 and looking forward from the shovel as the teeth tips guidance information or not show the relationship between the bucket 6 and the target work surface as viewed by the operator seated in the cabin 10 and looking forward from the shovel. The illustration of FIG. 7 shows the case where the second target work surface display image 433 is hatched and does not show the relationship between the bucket 6 and the target work surface as viewed by the operator seated in the cabin 10 and looking forward from the shovel.

The right-left body tilt display image 434 shows the condition of the inclination of the shovel to a horizontal plane in the right-left direction. According to the illustration of FIG. 7, the right-left body tilt display image 434 is displayed under the first target work surface display image 432. The right-left body tilt display image 434 shows a lateral shovel angle G31 and a lateral shovel icon G32. The lateral shovel angle G31 is a numerical value that indicates the angle of the shovel to a horizontal plane in the right-left direction. According to the illustration of FIG. 7, the lateral shovel angle G31 is 0.02°. The operator can know the exact lateral shovel angle G31 by looking at the right-left body tilt display image 434. The lateral shovel icon G32 is a graphic that schematically represents the lateral shovel angle G31. The lateral shovel icon G32 takes the form of a shovel and a horizontal plane as viewed from behind the shovel with reference to the horizontal plane, for example. According to this embodiment, the inclination of the part of the shovel in the lateral shovel icon G32 is fixed. The inclination of the part of the shovel in the lateral shovel icon G32, however, may be so displayed as to change as the lateral shovel angle G31 changes.

The front-rear body tilt display image 435 shows the condition of the inclination of the shovel to a horizontal plane in the front-rear direction. According to the illustration of FIG. 7, the front-rear body tilt display image 435 is displayed to the right of and adjoining to the right-left body tilt display image 434 under the second target work surface display image 433. The front-rear body tilt display image 435 shows a longitudinal shovel angle G33 and a longitudinal shovel icon G34. The longitudinal shovel angle G33 is a numerical value that indicates the angle of the shovel to a horizontal plane in the front-rear direction. According to the illustration of FIG. 7, the longitudinal shovel angle G33 is 0.07°. The operator can know the exact longitudinal shovel angle G33 by looking at the front-rear body tilt display image 435. The longitudinal shovel icon G34 is a graphic that schematically represents the longitudinal shovel angle G33. The longitudinal shovel icon G34 takes the form of a shovel and a horizontal plane as viewed from the side of the shovel with reference to the horizontal plane, for example. According to this embodiment, the inclination of the part of the shovel in the longitudinal shovel icon G34 is fixed. The inclination of the part of the shovel in the longitudinal shovel icon G34, however, may be so displayed as to change as the longitudinal shovel angle G33 changes.

The horizontal distance display image 436 shows information on the horizontal distance between predetermined two points (such as the above-described first point P1 and second point P2). According to the illustration of FIG. 7, the horizontal distance display image 436 is displayed under the right-left body tilt display image 434. The horizontal distance display image 436 shows a horizontal distance G35 and a horizontal distance icon G36. The horizontal distance G35 is a numerical value indicating the horizontal distance between the predetermined two points. According to the illustration of FIG. 7, the horizontal distance G35 is 0.86 feet (ft.). The horizontal distance icon G36 is a graphic that schematically represents the horizontal distance G35. According to the illustration of FIG. 7, the horizontal distance icon G36 is displayed to the left of the horizontal distance G35. The horizontal distance icon G36, however, may alternatively be displayed to the right of the horizontal distance G35. The horizontal distance icon G36 is represented by, for example, a first line segment indicating a horizontal plane, a second line segment that starts at an end point of the first line segment and extends at a predetermined angle to the first line segment, and a double-headed arrow serving as a second graphic parallel to the first line segment. The position of the starting point of the second line segment may be either the right end point of the first line segment or the left end point of the first line segment. Furthermore, the position of the starting point of the second line segment may change according to which of the height of the first point P1 from the horizontal plane and the height of the second point P2 from the horizontal plane is greater. For example, when the height of the second point P2 from the horizontal plane is smaller than the height of the first point P1 from the horizontal plane, the starting point of the second line segment is displayed as being the right end point of the first line segment. When the height of the second point P2 from the horizontal plane is greater than the height of the first point P1 from the horizontal plane, the starting point of the second line segment is displayed as being the left end point of the first line segment. When the height of the first point P1 from the horizontal plane and the height of the second point P2 from the horizontal plane are equal, the second line segment is displayed over the first line segment. According to the illustration of FIG. 7, the second line segment is expressed as extending toward the top left from the right end point of the first line segment. According to the illustration of FIG. 8, the second line segment is shown as extending toward the top right from the left end point of the first line segment. Furthermore, according to the illustrations of FIGS. 7 and 8, the double-headed arrow is displayed above the second line segment. The double-headed arrow, however, may alternatively be displayed below the first line segment. The operator can know the horizontal distance G35 between two points by looking at the horizontal distance display image 436. Furthermore, because the horizontal distance G35 is displayed in correspondence to the horizontal distance icon G36, the operator can easily recognize the horizontal distance G35.

The vertical distance display image 437 shows information on the vertical distance between predetermined two points (such as the above-described first point P1 and second point P2). According to the illustration of FIG. 7, the vertical distance display image 437 is displayed to the right of and adjoining to the horizontal distance display image 436 under the front-rear body tilt display image 435. The vertical distance display image 437 shows a vertical distance G37 and a vertical distance icon G38. The vertical distance G37 is a numerical value indicating the vertical distance between the predetermined two points. According to the illustration of FIG. 7, the vertical distance G37 is 0.86 ft. The vertical distance icon G38 is a graphic that schematically represents the vertical distance G37. According to the illustration of FIG. 7, the vertical distance icon G38 is displayed to the left of the vertical distance G37. The vertical distance icon G38, however, may alternatively be displayed to the right of the vertical distance G37. The vertical distance icon G38 is represented by, for example, a first line segment and a second line segment configured the same as in the horizontal distance icon G36 and a double-headed arrow serving as a second graphic perpendicular to the first line segment. According to the illustration of FIG. 7, the double-headed arrow is displayed to the left of the first line segment and the second line segment. The double-headed arrow, however, may alternatively be displayed to the right of the first line segment and the second line segment. The operator can know the vertical distance G37 between two points by looking at the vertical distance display image 437. Furthermore, because the vertical distance G37 is displayed in correspondence to the vertical distance icon G38, the operator can easily recognize the vertical distance G37.

The straight-line distance display image 438 shows information on the straight-line distance between predetermined two points (such as the above-described first point P1 and second point P2). According to the illustration of FIG. 7, the straight-line distance display image 438 is displayed under the horizontal distance display image 436. The straight-line distance display image 438 shows a straight-line distance G39 and a straight-line distance icon G40. The straight-line distance G39 is a numerical value indicating the straight-line distance between the predetermined two points. According to the illustration of FIG. 7, the straight-line distance G39 is 1.22 ft. The straight-line distance icon G40 is a graphic that schematically represents the straight-line distance G39. According to the illustration of FIG. 7, the straight-line distance icon G40 is displayed to the left of the straight-line distance G39. The straight-line distance icon G40, however, may alternatively be displayed to the right of the straight-line distance G39. The straight-line distance icon G40 is represented by, for example, a first line segment and a second line segment configured the same as in the horizontal distance icon G36 and a double-headed arrow serving as a second graphic perpendicular to the first line segment. According to the illustration of FIG. 7, the double-headed arrow is displayed above the second line segment. The operator can know the straight-line distance G39 between two points by looking at the straight-line distance display image 438. Furthermore, because the straight-line distance G39 is displayed in correspondence to the straight-line distance icon G40, the operator can easily recognize the straight-line distance G39.

The angle display image 439 shows information on the angle of a line segment connecting predetermined two points to a horizontal plane. According to the illustration of FIG. 7, the angle display image 439 is displayed to the right of and adjoining to the straight-line distance display image 438 under the vertical distance display image 437. The angle display image 439 shows an angle G41 and an angle icon G42. The angle G41 is a numerical value regarding the angle of a line segment connecting predetermined two points to a horizontal plane. According to the illustration of FIG. 7, the angle G41 is expressed as the ratio of a vertical length (height) and a horizontal length like "1:1." The angle G41 may alternatively be expressed in percentage (%) or permillage (‰) or be expressed in other unit systems such as degree measure, circular measure, and time notation, and "1:1" of FIG. 7 corresponds to 45° in degree measure. The angle icon G42 is a graphic that schematically represents the angle G41. According to the illustration of FIG. 7, the angle icon G42 is displayed to the left of the angle G41. The angle icon G42, however, may alternatively be displayed to the right of the angle G41. The angle icon G42 is represented by, for example, a first line segment and a second line segment configured the same as in the horizontal distance icon G36 and a circular arc serving as a second graphic placed between the first line segment and the second line segment. The operator can know the angle of a line segment connecting predetermined two points to a horizontal plane by looking at the angle display image 439. Furthermore, because the angle G41 is displayed in correspondence to the angle icon G42, the operator can easily recognize the angle G41.

According to the measurement mode, the horizontal distance display image 436, the vertical distance display image 437, the straight-line distance display image 438, and the angle display image 439 may be displayed simultaneously with the display part to display information on the body tilt condition of the shovel. Furthermore, the horizontal distance display image 436, the vertical distance display image 437, the straight-line distance display image 438, and the angle display image 439 may be displayed simultaneously with at least one of the display part to display information on the operating condition of the shovel and the display part to display information on the settings of the shovel. According to the illustration of FIG. 7, the display device D3 displays the horizontal distance display image 436, the vertical distance display image 437, the straight-line distance display image 438, and the angle display image 439 simultaneously with a body tilt image (the right-left body tilt display image 434 and the front-rear body tilt display image 435), the display part to display information on the operating condition of the shovel (the remaining aqueous urea solution amount display part 416, the remaining fuel amount display part 417, the coolant water temperature display part 418, and the engine operating time display part 419), and the display part to display information on the settings of the shovel (the rotational speed mode display part 412, the travel mode display part 413, the attachment display part 414, and the engine control status display part 415).

As described above, during shovel operation with the measurement mode, the display device D3 displays an image including numerical information indicating the relationship between predetermined two points (such as a straight-line distance, a horizontal distance, a vertical distance, and an angle) and graphics each corresponding to one of the numerical information items as illustrated in FIG. 7. Therefore, the operator can easily understand the straight-line distance, horizontal distance, vertical distance, and angle between the predetermined two points. That is, visibility is improved. This enables the operator to easily determine whether a work surface such as a slope is formed with a desired accuracy relative to a target work surface, thus improving work efficiency.

The above-described embodiment illustrates the case of using the measurement mode during work or after work. The measurement mode, however, may also be used when setting a target surface before work. In this case, measurement is performed, setting two points of a fixed ruler as a first point and a second point, and a reference plane is set based on the relationship between the first point and the second point. For example, a straight line connecting the first point and the second point on the fixed ruler serves as a reference plane. By setting a height (depth) relative to this reference plane as a target work surface, it is possible to easily set the target work surface using the measurement mode. The reference plane measured with the measurement mode may be set as the target work surface.

Furthermore, the above-described embodiment, in which the lateral shovel angle G31 and the longitudinal shovel angle G33 are displayed in larger size than the horizontal distance G35, the vertical distance G37, the straight-line distance G39, and the angle G41, is not limited to this. For example, the lateral shovel angle G31 and the longitudinal shovel angle G33 may be displayed in smaller size than or in the same size as the horizontal distance G35, the vertical distance G37, the straight-line distance G39, and the angle G41. Furthermore, at least one of the lateral shovel angle G31, the longitudinal shovel angle G33, the horizontal distance G35, the vertical distance G37, the straight-line distance G39, and the angle G41 may be highlighted and displayed. Examples of highlighting include a different color, boldface, and hatching.

Figure 9:
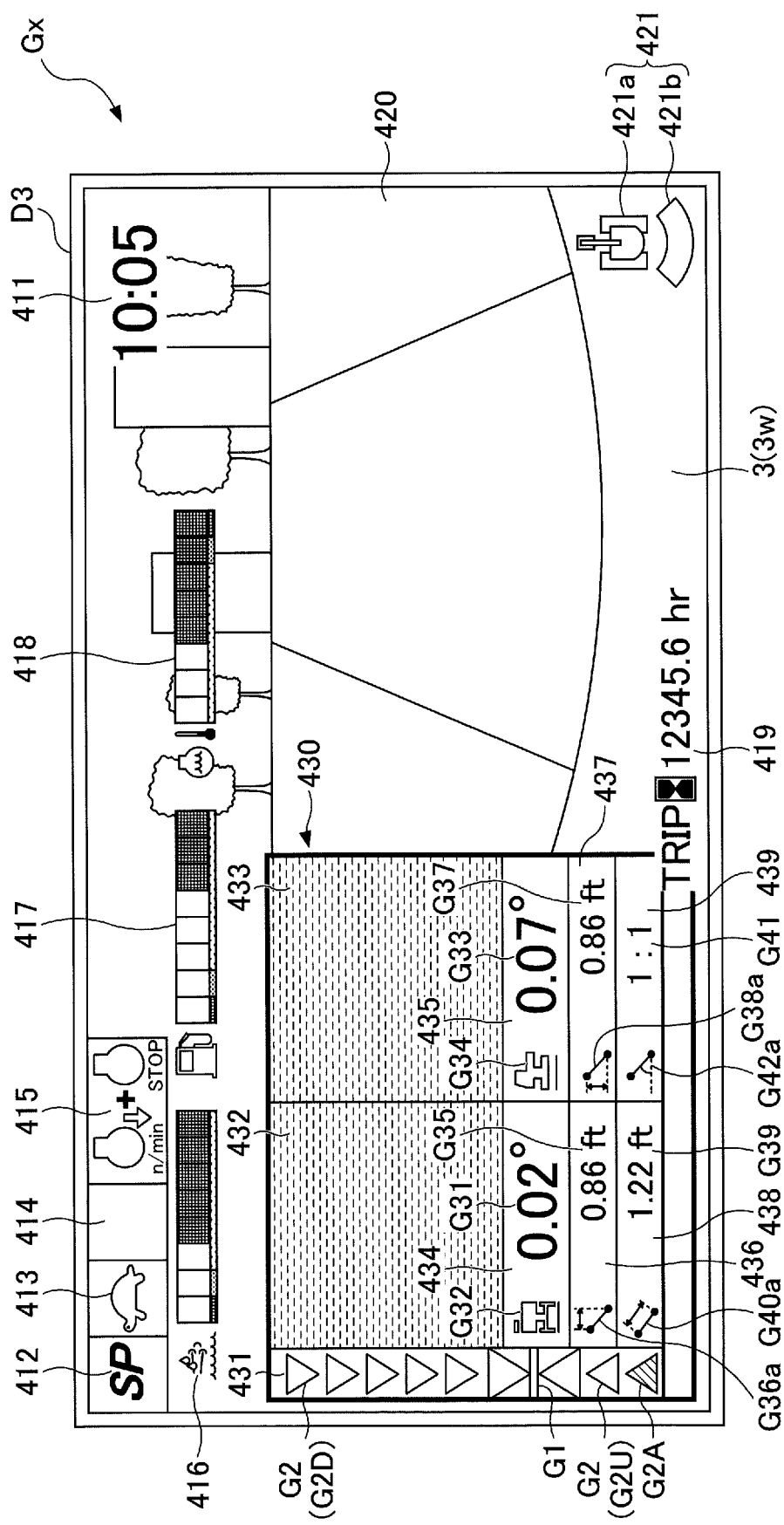
FIG. 9 is a diagram illustrating a second example layout of the output image displayed on the display device during a measurement mode.
Figure 10:
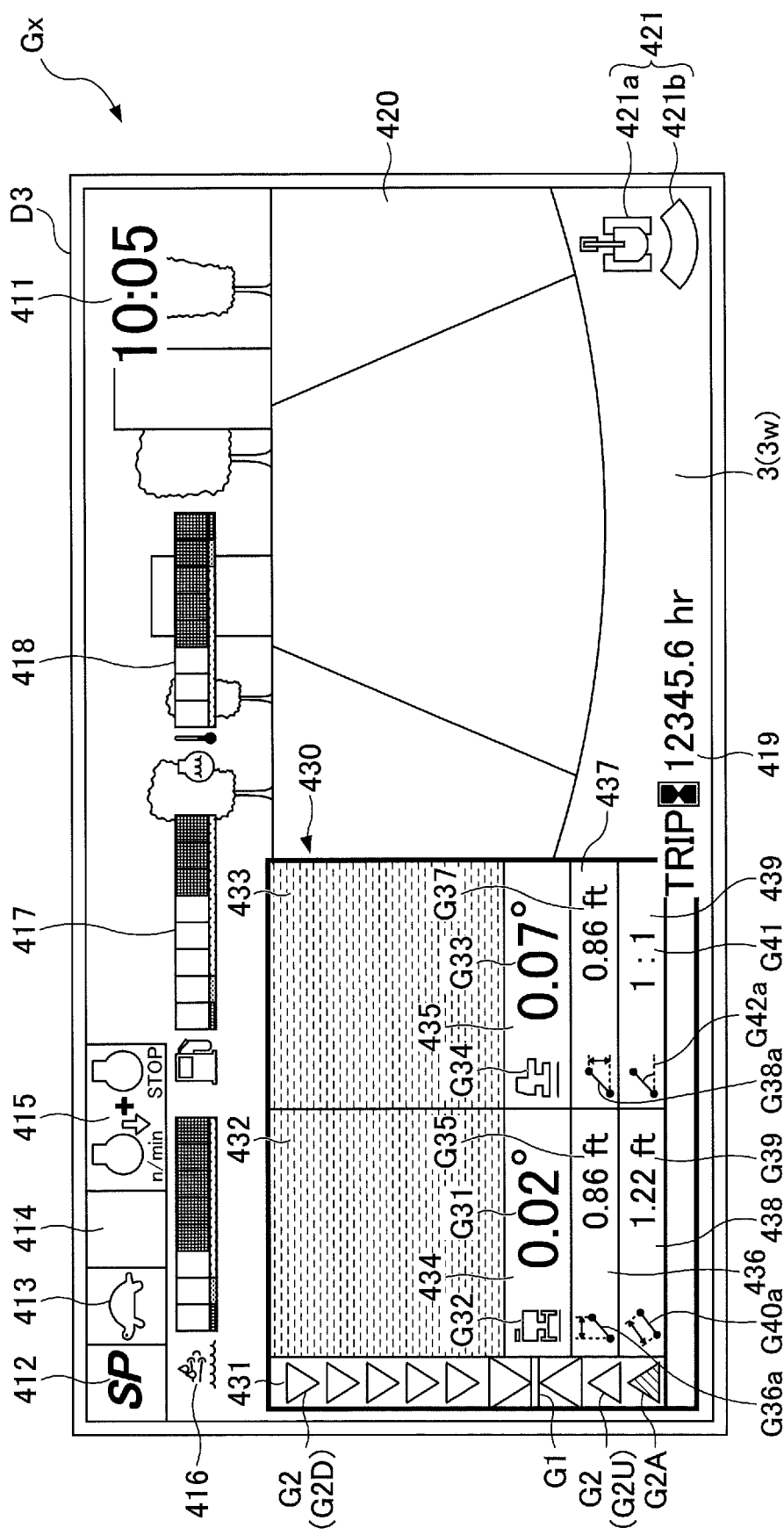
FIG. 10 is another diagram illustrating the second example layout of the output image displayed on the display device during the measurement mode.

Next, a second example layout of the output image Gx displayed during the measurement mode is described with reference to FIGS. 9 and 10. FIGS. 9 and 10 are diagrams illustrating a second example layout of the output image Gx displayed on the display device D3 during the measurement mode.

The output image Gx of the second example layout is different from the output image Gx of the first example layout in the shapes of the graphics of the horizontal distance display image 436, the vertical distance display image 437, the straight-line distance display image 438, and the angle display image 439 displayed in the work guidance display part 430 of the display device D3. Specifically, according to the second example layout, in place of the horizontal distance icon G36, the vertical distance icon G38, the straight-line distance icon G40, and the angle icon G42 of the first example layout, a horizontal distance icon G36a, a vertical distance icon G38a, a straight-line distance icon G40a, and an angle icon G42a are displayed in the work guidance display part 430. In other respects, the second example layout is equal to the first example layout. In the following, a description of the same components as those of the first example layout is omitted.

The horizontal distance icon G36a is a graphic that schematically represents the horizontal distance G35. The horizontal distance icon G36a is represented by, for example, two points indicating predetermined two points, a third line segment connecting the two points, and a double-headed arrow serving as a third graphic indicating the horizontal distance between the predetermined two points. The positions of the two points may change according to which of the height of the first point P1 from the horizontal plane and the height of the second point P2 from the horizontal plane is greater. For example, when the height of the second point P2 from the horizontal plane is smaller than the height of the first point P1 from the horizontal plane, the point placed on the left side is displayed higher than the point placed on the right side. When the height of the second point P2 from the horizontal plane is greater than the height of the first point P1 from the horizontal plane, the point placed on the left side is displayed lower than the point placed on the right side. When the height of the first point P1 from the horizontal plane and the height of the second point P2 from the horizontal plane are equal, the point placed on the left side and the point placed on the right side are displayed at the same vertical position. According to the illustration of FIG. 9, the point placed on the left side is displayed higher than the point placed on the right side. According to the illustration of FIG. 10, the point placed on the left side is displayed lower than the point placed on the right side. Furthermore, according to the illustrations of FIGS. 9 and 10, the double-headed arrow is displayed above the third line segment. The double-headed arrow, however, may alternatively be displayed below the third line segment. The operator can know the horizontal distance G35 between two points by looking at the horizontal distance display image 436. Furthermore, because the horizontal distance G35 is displayed in correspondence to the horizontal distance icon G36a, the operator can easily recognize the horizontal distance G35.

The vertical distance icon G38a is a graphic that schematically represents the vertical distance G37. The vertical distance icon G38 is represented by, for example, two points and a third line segment configured the same as in the horizontal distance icon G36a and a double-headed arrow serving as a third graphic representing the vertical distance between two predetermined points. According to the illustration of FIG. 9, the double-headed arrow is displayed to the left of the point placed on the left side. The double-headed arrow, however, may alternatively be displayed to the right of the point placed on the right side. The operator can know the vertical distance G37 between two points by looking at the vertical distance display image 437. Furthermore, because the vertical distance G37 is displayed in correspondence to the vertical distance icon G38a, the operator can easily recognize the vertical distance G37.

The straight-line distance icon G40a is a graphic that schematically represents the straight-line distance G39. The straight-line distance icon G40 is represented by, for example, two points and a third line segment configured the same as in the horizontal distance icon G36a and a double-headed arrow serving as a third graphic parallel to the third line segment. According to the illustration of FIG. 9, the double-headed arrow is displayed above the third line segment. The double-headed arrow, however, may alternatively be displayed below the third line segment. The operator can know the straight-line distance G39 between two points by looking at the straight-line distance display image 438. Furthermore, because the straight-line distance G39 is displayed in correspondence to the straight-line distance icon G40a, the operator can easily recognize the straight-line distance G39.

The angle icon G42a is a graphic that schematically represents the angle G41. The angle icon G42a is represented by, for example, two points and a third line segment configured the same as in the horizontal distance icon G36a, a fourth line segment representing a horizontal plane, and a circular arc serving as a third graphic placed between the third line segment and the fourth line segment. The operator can know the angle of a line segment connecting predetermined two points to a horizontal plane by looking at the angle display image 439. Furthermore, because the angle G41 is displayed in correspondence to the angle icon G42a, the operator can easily recognize the angle G41.

An embodiment of the present invention is described above. The above description does not limit the subject matter of the invention, and various variations and modifications may be made without departing from the scope of the present invention.

Figure 13:
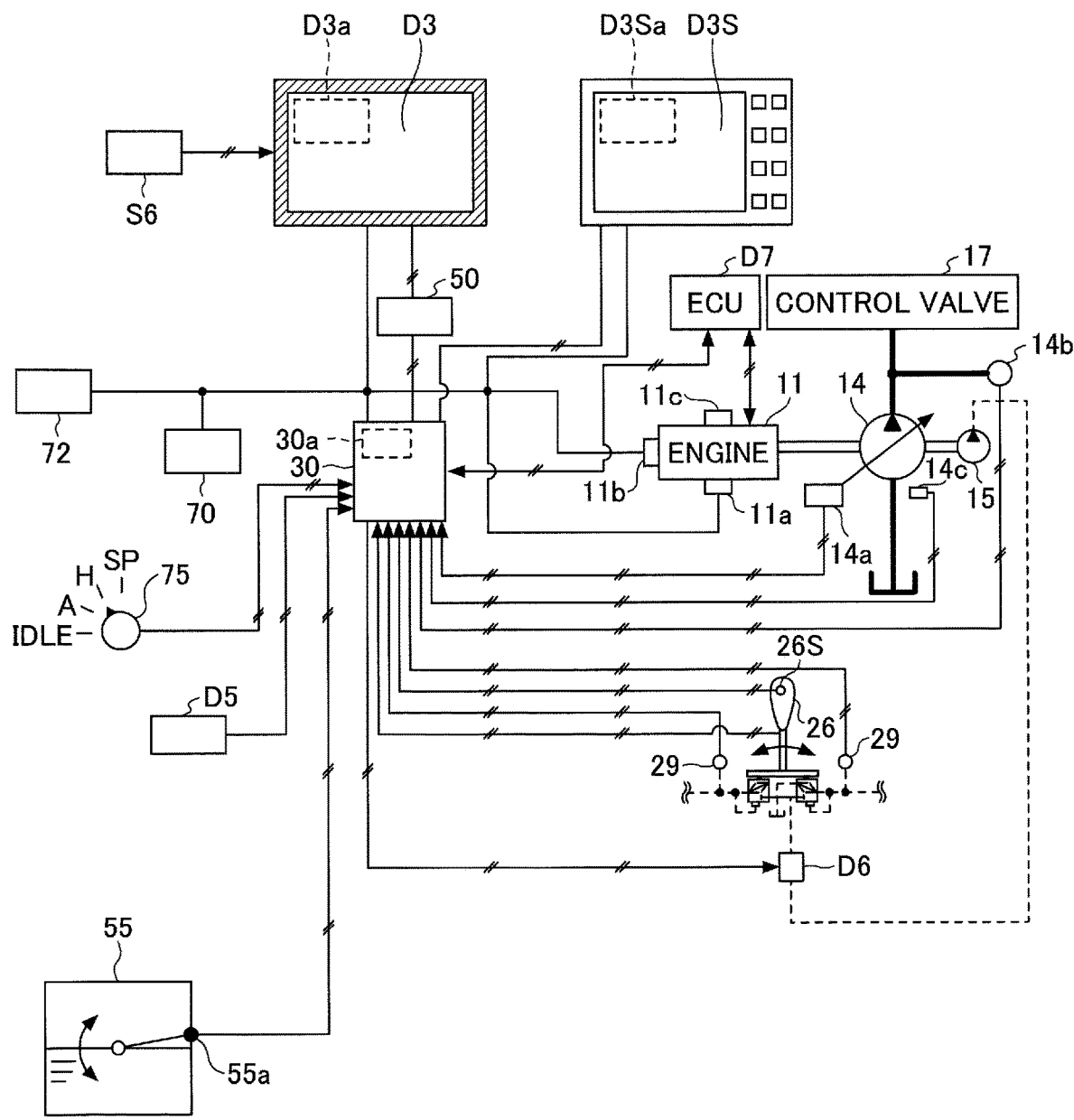
FIG. 13 is a diagram illustrating another example configuration of the drive control system of the shovel of FIG. 1.

FIG. 13 is a diagram illustrating another example configuration of the drive control system of the shovel of FIG. 1. As illustrated in FIG. 13, the shovel may include another display device D3S independent of the display device D3. For example, the same as the display device D3, the display device D3S includes a conversion part D3Sa that generates an image for display based on the output of the controller 30 or the machine guidance device 50. For example, the display device D3S is attached to an attachment stay vertically extending upward from the floor of the cabin 10. The display device D3 may be, for example, a monitor that displays a main screen, an information display and setting screen, etc. The display device D3S may be, for example, a monitor dedicated to functions using ICT, such as a machine guidance function and a machine control function. However, the display device D3 may display information associated with functions using ICT, such as a machine guidance function and a machine control function, and the display device D3S may display a main screen, an information display and setting screen, etc.

Figure 11:
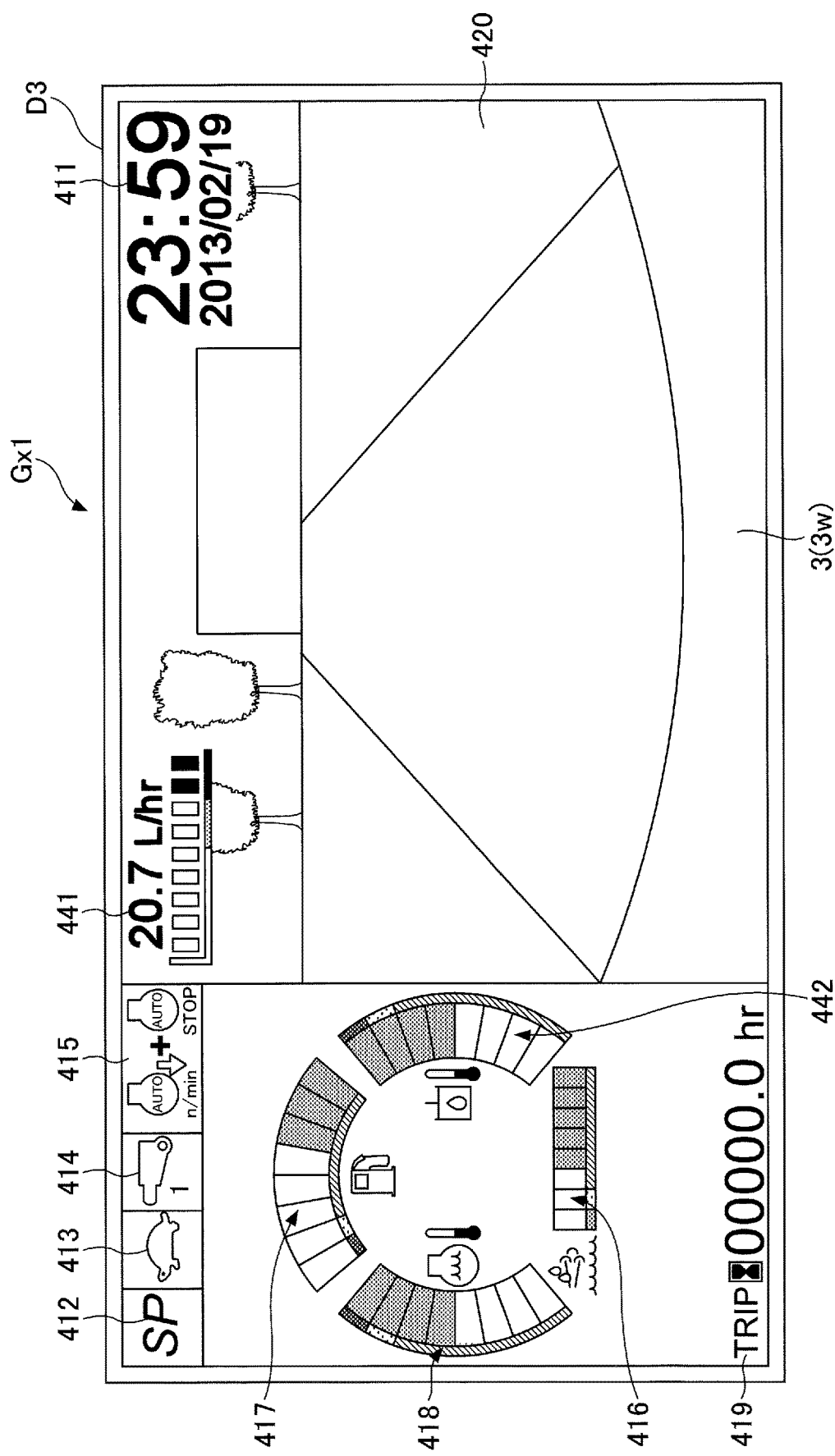
FIG. 11 is a diagram illustrating an example layout of an output image displayed on the display device during the measurement mode.
Figure 12:
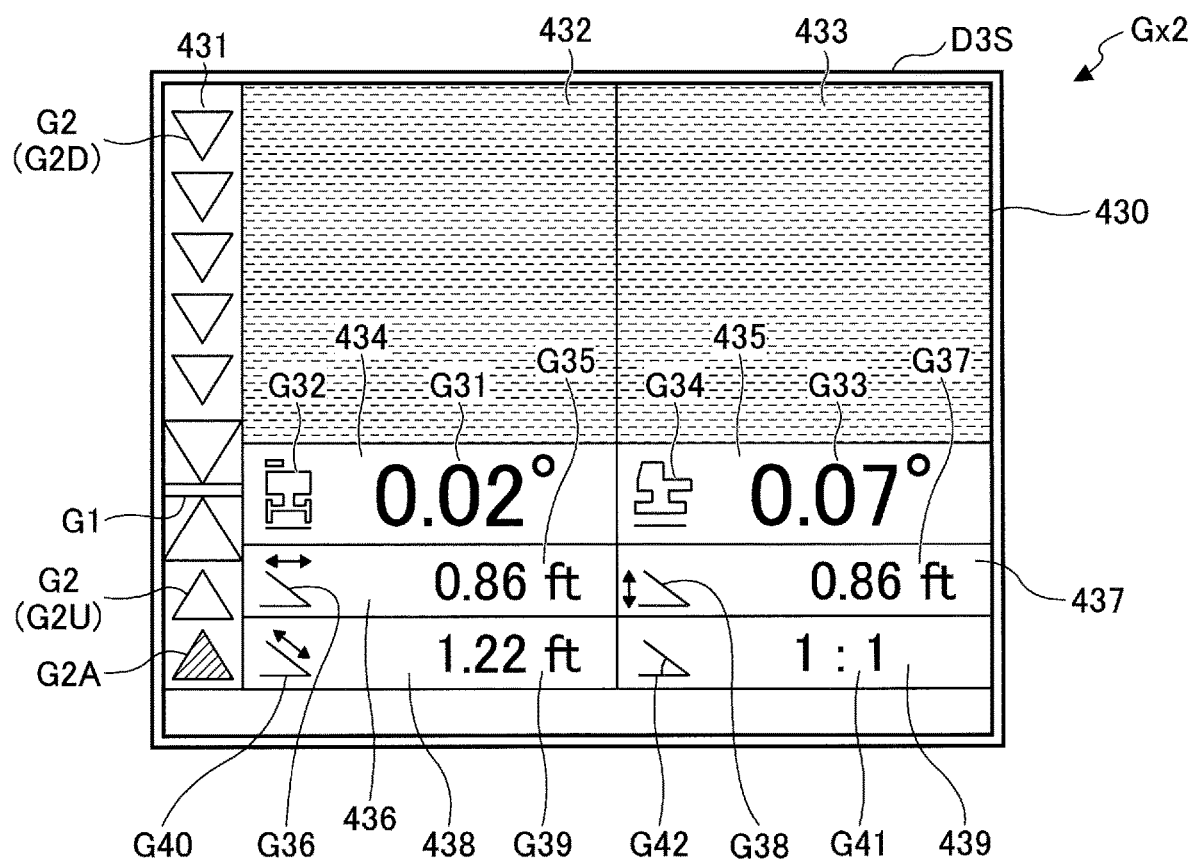
FIG. 12 is a diagram illustrating an example layout of an output image displayed on another display device during the measurement mode.

FIG. 11 is a diagram illustrating an example layout of an output image displayed on the display device D3 during the measurement mode. FIG. 12 is a diagram illustrating an example layout of an output image displayed on the other display device D3S during the measurement mode.

According to the illustrations of FIGS. 11 and 12, the display device D3 displays a main screen, an information display and setting screen, etc., and the display device D3S displays information associated with functions using ICT, such as a machine guidance function, a machine guidance function, and a machine control function.

Specifically, as illustrated in FIG. 11, an output image Gx1 displayed on the display device D3 includes the time display part 411, the rotational speed mode display part 412, the travel mode display part 413, the attachment display part 414, the engine control status display part 415, the remaining aqueous urea solution amount display part 416, the remaining fuel amount display part 417, the coolant water temperature display part 418, the engine operating time display part 419, the camera image display part 420, an average fuel efficiency display part 441, and an hydraulic oil temperature display part 442. As illustrated in FIG. 12, an output image Gx2 displayed on the display device D3S includes the work guidance display part 430.

What is claimed is:

1. A shovel comprising:
   a lower traveling body;
   an upper turning body turnably mounted on the lower traveling body;
   a cab mounted on the upper turning body;
   an attachment attached to the upper turning body; and
   a display device provided in the cab,
   wherein the display device is configured to display an image, the image including a plurality of numerical information items indicating a relationship between two positions of a leading edge of the attachment at two points of time and a plurality of graphics each corresponding to one of the numerical information items.

2. The shovel as claimed in claim 1, wherein the graphics are displayed in respective different areas.

3. The shovel as claimed in claim 1, wherein one of the numerical information items and one of the graphics that correspond to each other are displayed in a same area.

4. The shovel as claimed in claim 1, wherein the numerical information items include a straight-line distance, a horizontal distance, a vertical distance, and an angle relative to a horizontal plane between the two positions of the leading edge of the attachment.

5. The shovel as claimed in claim 1, wherein each of the graphics includes a first line segment indicating a horizontal plane, a second line segment starting at an end point of the first line segment and extending at a predetermined angle to the first line segment, and a second graphic having a shape corresponding to said each of the graphics.

6. The shovel as claimed in claim 1, wherein each of the graphics includes two points corresponding to the two positions of the leading edge of the attachment, a third line segment connecting the two points, and a third graphic having a shape corresponding to said each of the graphics.

7. The shovel as claimed in claim 1, wherein the display device is configured to simultaneously display a display part to display the numerical information items and the graphics and a display part to display a body tilt condition of the shovel.

8. The shovel as claimed in claim 7, wherein
   the display part to display the body tilt condition of the shovel includes a shovel icon taking a form of the shovel, and
   the shovel icon is configured to change according to the body tilt condition of the shovel.

9. The shovel as claimed in claim 8, wherein the shovel icon takes, the form of the shovel as viewed from behind the shovel, and is configured to change according to a change in a tilt angle of the shovel relative to a horizontal plane in a right-left direction.

10. The shovel as claimed in claim 8, wherein the shovel icon takes the form of the shovel as viewed from a side of the shovel, and is configured to change according to a change in a tilt angle of the shovel relative to a horizontal plane in a front-rear direction.

11. The shovel as claimed in claim 7, wherein
    the display part to display the body tilt condition of the shovel includes a shovel angle that is an angle of the shovel relative to a horizontal plane in at least one of a right-left direction and a front-rear direction, and
    the display device is configured to highlight and display at least one of the shovel angle and the numerical information items.

12. The shovel as claimed in claim 1, wherein the display device is configured to display an image that includes multiple numerical information items and multiple graphics, the multiple numerical information items being related to a positional relationship between a first point and a second point, the first point being a position of the leading edge of the attachment at a first point of time, the second point being a position of the leading edge of the attachment at a second point of time, the multiple graphics representing types of the positional relationship indicated by the multiple numerical information items in such a manner that the types are distinguishable.

13. The shovel as claimed in claim 1, wherein the display device is configured to display an image that includes multiple numerical information items and multiple graphics, the multiple numerical information items being related to a positional relationship that includes a distance and an angle between a first point and a second point, the first point being a position of the leading edge of the attachment at a first point of time, the second point being a position of the leading edge of the attachment at a second point of time, the multiple graphics representing types of the positional relationship indicated by the multiple numerical information items in such a manner that the types are distinguishable.

14. A display device for a shovel, the shovel including an attachment, wherein:
    the display device is configured to display an image, the image including a plurality of numerical information items indicating a relationship between two positions of a leading edge of the attachment at two points of time and a plurality of graphics each corresponding to one of the numerical information items.

15. A display method for a shovel, the shovel including an attachment, the display method comprising:
    displaying an image, the image including a plurality of numerical information items indicating a relationship between two positions of a leading edge of the attachment at two points of time and a plurality of graphics each corresponding to one of the numerical information items.

* * * * *